United States Patent [19]
Satomi et al.

[11] Patent Number: 5,627,418
[45] Date of Patent: May 6, 1997

[54] COMBINED LINEAR-ROTARY STEPPING MOTOR

[75] Inventors: Hirobumi Satomi; Takao Iwasa, both of Kashiwa, Japan

[73] Assignee: Oriental Motor Co., Ltd., Tokyo, Japan

[21] Appl. No.: 341,099

[22] Filed: Nov. 17, 1994

[30] Foreign Application Priority Data

Nov. 19, 1993 [JP] Japan .................................. 5-290176
Aug. 23, 1994 [JP] Japan .................................. 6-198082

[51] Int. Cl.$^6$ ........................................... H02K 41/00
[52] U.S. Cl. .......................... 310/12; 310/166; 310/191; 310/254; 310/269; 318/115
[58] Field of Search ................... 310/49 R, 269, 310/191, 12, 254, 261; 318/115

[56] References Cited

U.S. PATENT DOCUMENTS

| | | | |
|---|---|---|---|
| 3,889,165 | 6/1975 | Van ............................................. | 318/115 |
| 4,618,808 | 10/1986 | Ish-Salom et al. ........................ | 318/696 |
| 4,712,027 | 12/1987 | Karidis ...................................... | 310/12 |
| 4,719,381 | 1/1988 | Miles ......................................... | 310/166 |
| 5,093,596 | 3/1992 | Hammer .................................... | 310/191 |
| 5,315,751 | 5/1994 | Hammer .................................... | 310/12 X |

FOREIGN PATENT DOCUMENTS 0004995 10/1979 European Pat. Off. .
0319096 6/1989 European Pat. Off. .

*Primary Examiner*—Mark O. Budd
*Attorney, Agent, or Firm*—Jacobson, Price, Holman & Stern, PLLC

[57] ABSTRACT

A combined linear-rotary stepping motor shares stator iron plates and mover iron cores for a linear motor portion and a rotary motor portion without lengthening the length in the shaft direction.

The combined linear-rotary stepping motor includes a stator 1 having a stator iron core 10 provided with a plurality of salient poles 11, 12, 13, . . . composed of the salient poles having a plurality of first stator teeth 24 formed in inner peripheral surfaces thereof in the direction of a shaft 21 and the salient poles having a plurality of second stator teeth 25 formed in inner peripheral surfaces thereof in the circumferential direction and a mover 2 having mover iron cores 22a and 22b supported within the stator 1 movably in the shaft direction and rotatably and provided with a plurality of mover teeth 26 formed in outer peripheral surfaces thereof at an equal pitch in the shaft direction and the circumferential direction in opposing relation to the first and second stator teeth 24, 25. The stator iron core 10 is formed by laminating stator iron plates 30 while rotating the plates by a predetermined angle so that the first stator teeth 24 are formed in the inner peripheral surfaces of the specified salient poles in the shaft direction.

11 Claims, 19 Drawing Sheets

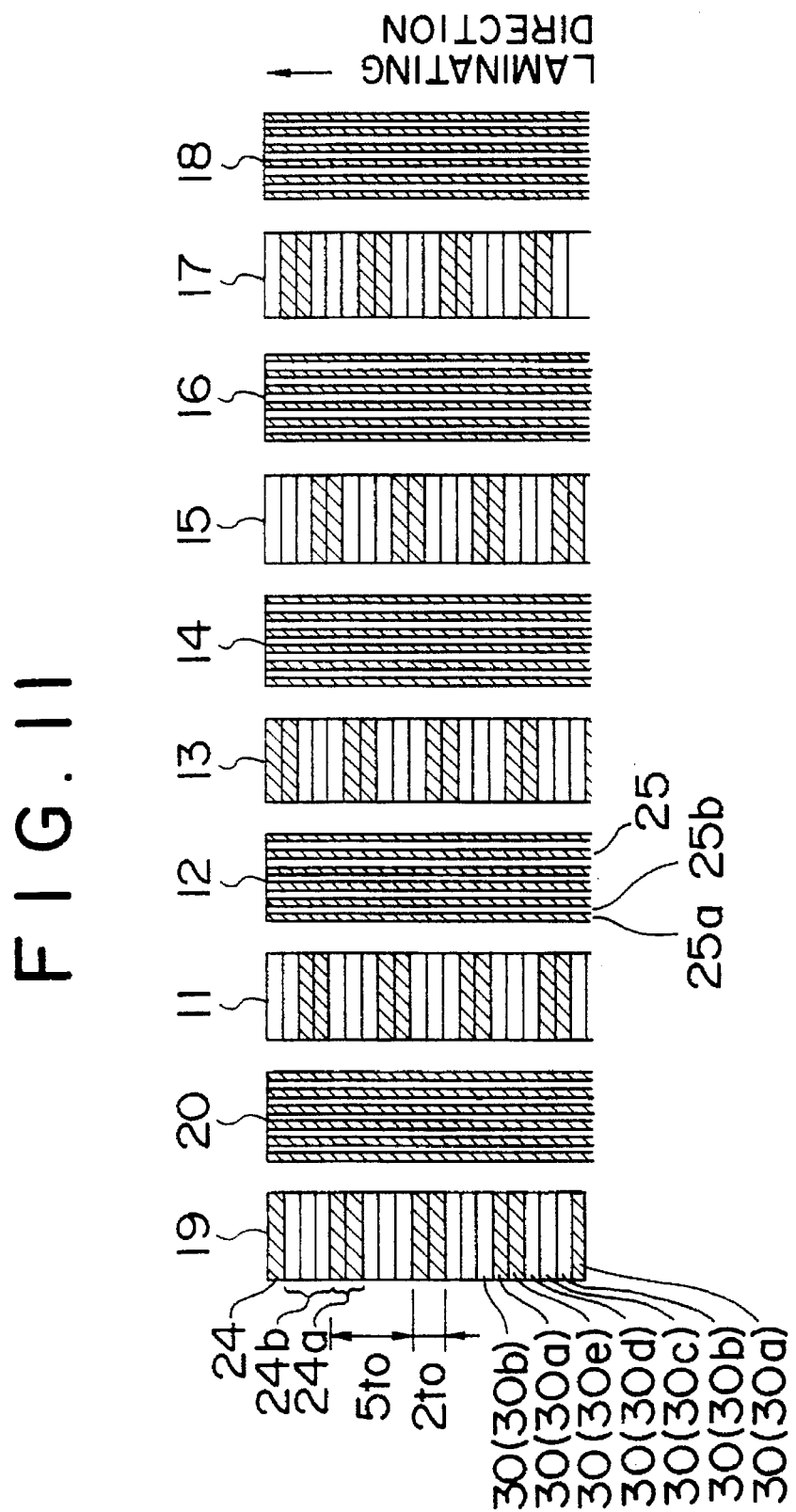

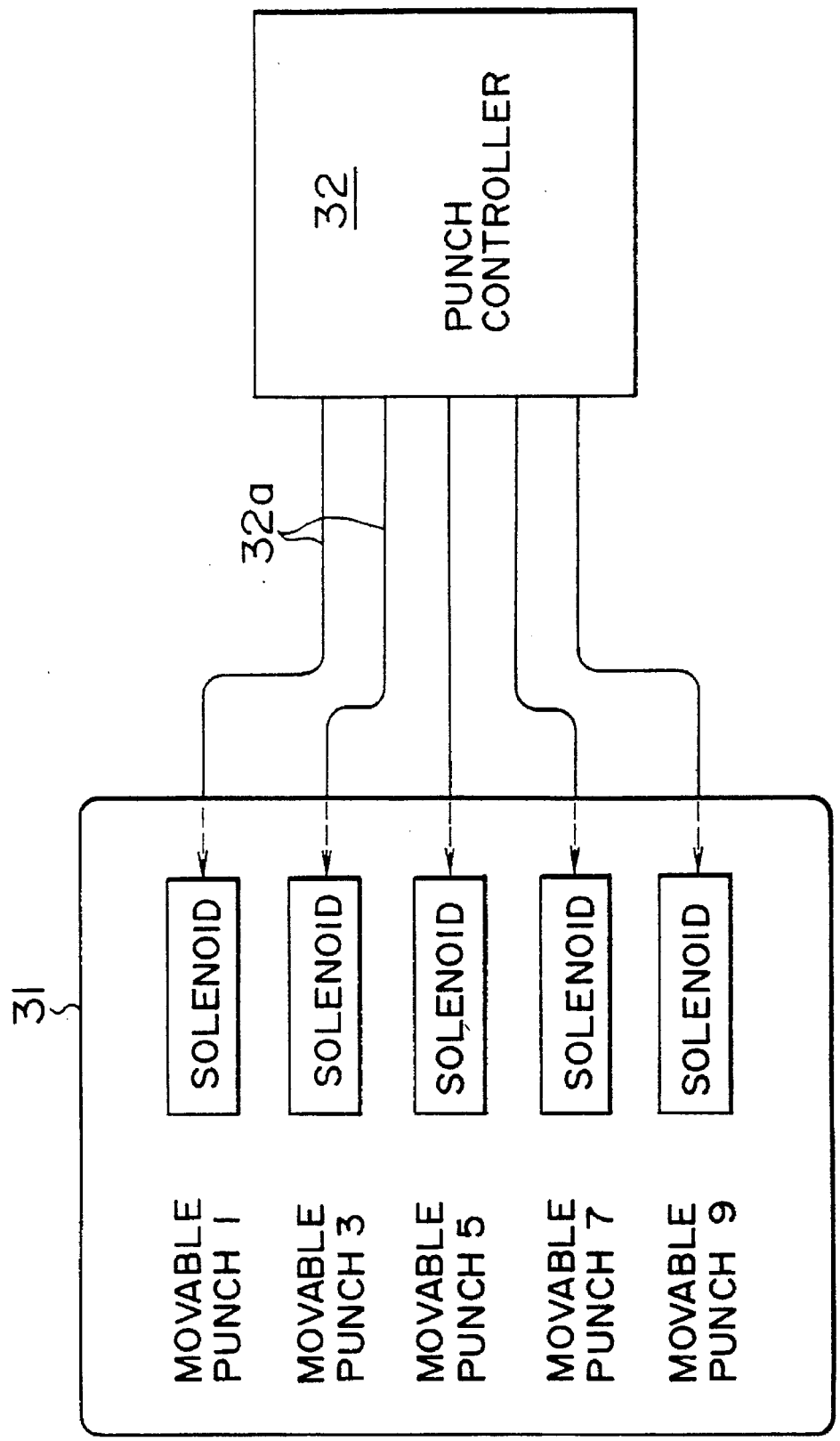

FIG. 15

| PUNCHING AND LAMINATING ORDER | 1 | 2 | 3 | 4 | 5 | 6 | 7 | 8 | 9 | 10 | 11 | 12 | --- |
|---|---|---|---|---|---|---|---|---|---|---|---|---|---|
| MOVABLE PUNCH 1 | ● | ○ | ○ | ● | ● | ● | ○ | ○ | ● | ● | ● | ○ | --- |
| MOVABLE PUNCH 3 | ● | ● | ● | ○ | ○ | ● | ● | ● | ○ | ○ | ● | ● | --- |
| MOVABLE PUNCH 5 | ○ | ○ | ● | ● | ● | ○ | ○ | ● | ● | ● | ○ | ○ | --- |
| MOVABLE PUNCH 7 | ● | ● | ○ | ○ | ● | ● | ● | ○ | ○ | ● | ● | ● | --- |
| MOVABLE PUNCH 9 | ○ | ● | ● | ● | ○ | ○ | ● | ● | ● | ○ | ● | ● | --- |
| CONFIGURATION OF IRON PLATE | 30a 30b | 30c 30d | 30e 30a | 30d 30b | 30e 30a | 30b 30d | 30c 30e | 30d 30b | 30a 30c | 30b 30d | 30c 30e | 30d 30a | |

● : OPERATING STATE OF MOVABLE PUNCH (PUNCH PUSHED OUT)

○ : NON-OPERATING STATE OF MOVABLE PUNCH (PUNCH WITHDRAWN)

1

COMBINED LINEAR-ROTARY STEPPING MOTOR

FIELD OF THE INVENTION AND RELATED ART STATEMENT

The present invention relates to a combined linear-rotary stepping motor.

As a motor of this kind in a field relating to the present invention, U.S. Pat. No. 5,093,596 discloses a combined linear-rotary direct drive step motor including a cylindrical three-phase variable reluctance type linear pulse motor portion and a hybrid type rotary step motor portion or a three-phase variable reluctance type rotary step motor portion disposed side by side in the shaft direction and having a common output shaft. Both of the motor portions are accommodated in one housing.

However, the combined linear-rotary direct drive step motor has the following problems:

(1) Since the linear motor portion and the rotary motor portion are disposed side by side in the shaft direction, the length thereof in the shaft direction is lengthened.

(2) A stator of the linear motor portion includes stator iron plates and spacer iron plates which are laminated alternately. When a stator iron core is manufactured, two kinds of iron plates must be laminated alternately and tips of salient poles must be bent alternately. Accordingly, the stator iron core cannot be manufactured easily.

(3) Three kinds of iron plates including the stator iron plates for the rotary motor portion, the stator iron plates for the linear motor portion and the spacer iron plates are required.

(4) Two stators for the linear motor portion and the rotary motor portion are required and it is necessary to assemble the two stators in the shaft direction after windings and connection works have been made separately. Accordingly, the assembling work efficiency of the whole motor is deteriorated.

(5) When a permanent magnet is disposed within the mover, two kinds of movers are also required to be disposed on the same shaft. Accordingly, the configuration thereof is complicated and the assembling efficiency is deteriorated.

OBJECT AND SUMMARY OF THE INVENTION

[I] The present invention has been made in order to solve the above problems and an object of the present invention is to provide a combined linear-rotary stepping motor including stator iron plates and a mover iron core which can be shared by a linear motor portion and a rotary motor portion and having a length in the shaft direction which is not lengthened and excellent assembling work efficiency of the whole motor.

In order to achieve the above object, the combined linear-rotary stepping motor of the present invention comprises a stator including a stator iron core having a plurality of salient poles of two kinds disposed radially inward, said salient poles of one kind having a plurality of first stator teeth formed in an inner peripheral surface thereof in the shaft direction, the salient poles of the other kind having a plurality of second stator teeth formed in an inner peripheral surface thereof in the circumferential direction and a mover including a mover iron core supported within the stator movably in the shaft direction and rotatably in the rotation direction and having a plurality of mover teeth formed in an outer peripheral surface thereof at an equal pitch in the shaft direction and the circumferential direction in opposing relation to the first and second stator teeth, and is further configured as follows:

(1) The stator iron core is formed by laminating stator iron plates including the salient poles constituting tooth tops of the teeth and the salient poles constituting tooth bottoms of the teeth, which are disposed in a predetermined relation, while rotating the stator iron plates by a predetermined angle determined by the number of phases, the number of salient poles and the predetermined relation so that the first stator teeth are formed in the inner peripheral surface of the salient pole in the shaft direction.

(2) The stator iron core is formed by punching iron plates forming the iron core by a punching mold while controlling to selectively push out and withdraw movable punches included within the punching mold and disposed to be able to be pushed out and withdrawn in each of the salient poles by a punch controller and laminating said punched iron plates successively so that the tips of the salient poles constitute tooth tops or tooth bottoms of the first stator teeth at a predetermined period for each punching of the iron plates in order to form the first stator teeth in the inner peripheral surface of the salient poles in the shaft direction.

(3) In the item (1) or (2), the stator iron core comprises 2 km salient poles disposed inward at an equal pitch angle, the 2 km salient poles including salient poles having the first stator teeth formed in the shaft direction and salient poles having the second stator teeth formed in the circumferential direction, both of the salient poles being disposed alternately when m is the number of phases of each linear-rotary motor and k is an integer equal to or larger than 1, and the mover iron cores include Zr mover teeth formed in the circumferential direction. There is further provided a permanent magnet held between the stator iron cores or between the mover iron cores and magnetized in the shaft direction, and the number of the mover teeth Zr in the circumferential direction of the mover satisfies $$Zr = k(mb+a)$$

where b is an integer equal to or larger than 1, a is an odd number satisfying $1 \leq a < 2m$ when m is an even number and is an integer satisfying $1 \leq a < m$ or $m < a < 2m$ when m is an odd number.

(4) In the item (2), the stator iron core comprises 2(m+n) salient poles disposed inward and including m sets of the salient poles each set having two adjacent salient poles having first stator teeth formed in the shaft direction and n sets of the salient poles each set having two adjacent salient poles having second stator teeth formed in the circumferential direction when m is the number of phases of a linear motor portion and n is the number of phases of a rotary motor portion.

In operation of the present invention, the combined linear-rotary stepping motor as configured above includes the salient poles for the linear motor portion and the salient poles for the rotary motor portion disposed side by side within one stator and accordingly the combined stepping motor can be configured without lengthening the length in the shaft direction. Further, since the stator is only one, the winding and connecting work is performed only one time and the assembling work efficiency of the whole motor is excellent. Since the stator iron core can be manufactured by rotation and lamination of the stator iron plates or by punching and laminating the stator iron plates while controlling to push out and withdraw the movable punches included in the punching mold in each of the salient poles to be the operating state as the punch or the non-operating state as the punch in the predetermined order, the stator iron core can be manufactured easily without the need of a plurality of stator iron plate punching molds. Further, since the mover iron core can be shared by the linear motor portion and the rotary motor portion, it is not necessary to provide two kinds of movers for the linear motor portion and the rotary motor portion.

[II] However, the combined linear-rotary stepping motor as configured above has the following problems:

(1) Since the plurality of mover teeth are formed at an equal pitch in the outer peripheral surface of the mover iron core in the shaft direction and the circumferential direction in opposing relation to the first and second stator teeth, it is difficult to manufacture the mover iron core by the other method than the lamination method of two kinds of mover iron plates such as, for example, the cutting work.

(2) When the length of the mover iron core in the shaft direction is considered to be divided into the linear motor portion and the rotary motor portion, the mover teeth are disposed uniformly in the shaft direction and the circumferential direction and accordingly the lengths of the mover iron core in the shaft direction for the linear motor portion and the rotary motor portion are set to be substantially same same. In other words, the ratio of the mover for the linear motor portion and the rotary motor portion cannot be set to any value.

The present invention has been made in view of the above problems and another object of the present invention is to solve the above problems and provide a combined linear-rotary stepping motor which can share stator iron plates and set the ratio of mover for a linear motor portion and a rotary motor portion to any value and having excellent assembling work efficiency of the whole motor.

In order to achieve the above object, the combined linear-rotary stepping motor of the present invention comprises a stator iron core having a plurality of salient poles of two kinds disposed radially inward, the salient poles of one kind having a plurality of first stator teeth formed in an inner peripheral surface thereof in the shaft direction, the salient poles of the other hand having a plurality of second stator teeth formed in an inner peripheral surface thereof in the circumferential direction and a mover including a plurality of mover iron cores supported within the stator movably in the shaft direction and rotatably in the rotation direction by means of a shaft and disposed in the shaft direction, the mover iron cores including two kinds of first and second mover iron cores, the first mover iron cores including a plurality of first mover teeth formed in an outer peripheral surface thereof at an equal pitch in the shaft direction in opposing relation to the first stator teeth, the second mover iron cores including a plurality of second mover teeth formed in an outer peripheral surface thereof at an equal pitch in the circumferential direction in opposing relation to the second stator teeth, and is configured as follows:

(1) The stator iron core includes first stator teeth formed in the shaft direction with a tooth pitch of $cmt_0$ by laminating successively and repeatedly cm kinds of stator iron plates constituting the stator iron core and having tips of salient poles formed into different shapes with respect to a plane coordinate axis when the number of phases of a linear motor portion is m, k sets of salient poles each set constituted by cm salient poles having the first stator teeth shifted with respect to the first stator teeth of a certain salient pole by $(d/2m)cmt_0$ in the movement direction of the mover in ckm stator salient poles having the first stator teeth formed, where $c=1$ when m is an odd number, $c=2$ when m is an even number, $t_0$ is a thickness of the iron plate, k is an integer equal to or larger than 1, and d is (cm−1) different integers satisfying $1 \leq d \leq 2m-1$.

(2) The stator iron core is formed by laminating the stator iron plates including the salient poles constituting tooth tops of the first stator teeth and the salient poles constituting tooth bottoms of the teeth, both of the salient poles being disposed in a predetermined relation, while rotating the stator iron plates by a predetermined angle determined by the number of phases, the number of salient poles and the predetermined relation so that the first stator teeth are formed in the inner peripheral surface of the salient pole in the shaft direction, tooth tops and tooth bottoms of the second stator teeth being laminated by laminating stator iron plates while rotating the stator iron plates by the predetermined angle at the same time.

(3) The stator iron core is formed by punching iron plates forming the iron core by a punching mold while controlling to selectively push out and withdraw movable punches included within the punching mold and disposed to be able to be pushed out and withdrawn in each of the salient poles by a punch controller so that the tips of the salient poles constitute tooth tops or tooth bottoms of the first stator teeth at a predetermined period for each punching of the iron plates and laminating the punched iron plates successively in order to form the first stator teeth in the inner peripheral surface of the salient poles in the shaft direction.

(4) In the item (1) or (2) or (3), the stator iron cores comprise 2 km salient poles disposed inward at an equal pitch angle, the 2 km salient poles including the salient poles having the first stator teeth formed in the shaft direction and the salient poles having the second stator teeth formed in the circumferential direction, both of the salient poles being disposed alternately when m is the number of phases of each linear-rotary motor and k is an integer equal to or larger than 1, the first mover iron core having a plurality of first mover teeth formed in the shaft direction at a tooth pitch corresponding to a tooth pitch of the first stator teeth, and the second mover iron core has Zr second mover teeth formed in the circumferential direction. There is further provided a permanent magnet held between a pair of the first and second mover iron cores and magnetized in the shaft direction, and the same number of the first mover iron cores and the second mover iron cores are magnetized to N and S poles by the permanent magnet. The number of the second mover teeth Zr satisfies $$Zr=k(mb+a)$$

where b is an integer equal to or larger than 1, a is an odd number satisfying $1 \leq a < 2m$ when m is an even number and is an integer satisfying $1 \leq a < m$ or $m < a < 2m$ when m is an odd number.

(5) In the item (1) or (2) or (3), the mover comprises two pairs of mover cores disposed symmetrically in the shaft, the pair of mover cores including one first mover core for a linear motor and one second mover core for a rotary motor, both of which are formed integrally, and a permanent magnet held between the pair of mover cores and magnetized in the shaft direction.

(6) In the item (1) or (2) or (3), the mover comprises, for a linear motor, two first mover iron cores and a permanent magnet held between the first mover iron cores and magnetized in the shaft direction and comprises, for a rotary motor, two second mover iron cores and a permanent magnet held between the second mover iron cores and magnetized in the shaft direction, all of which are disposed in the shaft.

(7) In the item (1) or (3), the stator iron core comprises 2(m+n) salient poles disposed inward and including m pairs of salient poles each pair having two adjacent salient poles having first stator teeth formed in the shaft direction and n pairs of salient poles each pair having two adjacent salient poles having second stator teeth formed in the circumferential direction when m is the number of phases of a linear motor portion and n is the number of phases of a rotary motor portion.

In operation of the present invention, the combined linear-rotary stepping motor configured above is configured to include two kinds of the first mover iron core having the plurality of first mover teeth formed in the outer peripheral surface thereof at an equal pitch in the shaft direction and the second mover iron core having the second mover teeth formed in the outer peripheral surface there of at an equal pitch in the circumferential direction or is configured to include the portion having the plurality of first mover teeth formed at an equal pitch in the shaft direction and the portion having the plurality of second mover teeth formed at an equal pitch in the circumferential direction and both of the portions are disposed in one mover iron core in the shaft direction. Accordingly, manufacturing thereof by mechanical work such as cutting is easy and the length of the mover iron cores of two kinds or the length of the portions of two kinds can be set to any value. In other words, the ratio of the mover for the linear motor portion and the rotary motor portion can be set to any value.

BRIEF DESCRIPTION OF THE DRAWINGS

FIGS. 10(a) and 10(b) show a stator iron plate forming a stator iron core of a combined linear-rotary stepping motor of a third embodiment according to the present invention wherein FIG. 10(a) is a plan view thereof with FIG. 10(b) being an enlarged view of the portion A shown in FIG. 10(a);

FIG. 11 is an expanded view of first and second stator teeth formed when the stator iron plates of FIGS. 10(a) and 10(b) are laminated while rotated by 144 degrees or when the stator iron plates of FIGS. 13(a)–13(e) are laminated successively in the laminating order shown in FIG. 15;

FIG. 14 is a schematic diagram of an apparatus for controlling movable punches included in a punching mold for the stator iron plate;

FIG. 15 is a diagram showing a relation of a punching and laminating order of the stator iron plates used in control of the apparatus shown in FIG. 14 and control states of the movable punches;

FIGS. 16(a) and 16(b) are diagrams illustrating control states of movable punches included in the punching mold, wherein FIG. 16(a) shows its operating state and FIG. 16(b) shows its non-operating state;

DETAILED DESCRIPTION OF A PREFERRED EMBODIMENT

Preferred embodiments of the present invention are now described in detail with reference to the drawings.

[First Embodiment]

Figure 1:
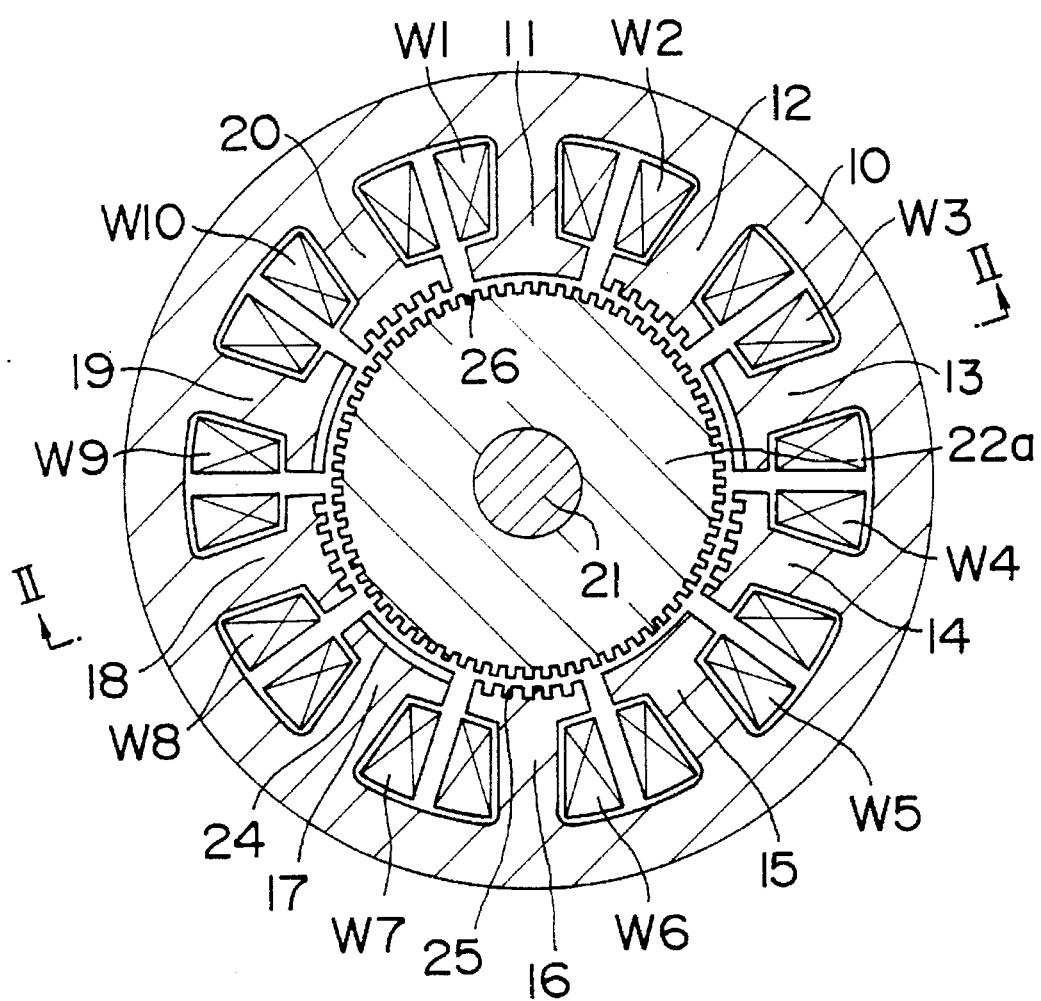
FIG. 1 is a transverse sectional view illustrating a first embodiment of a combined linear-rotary stepping motor according to the present invention.
Figure 2:
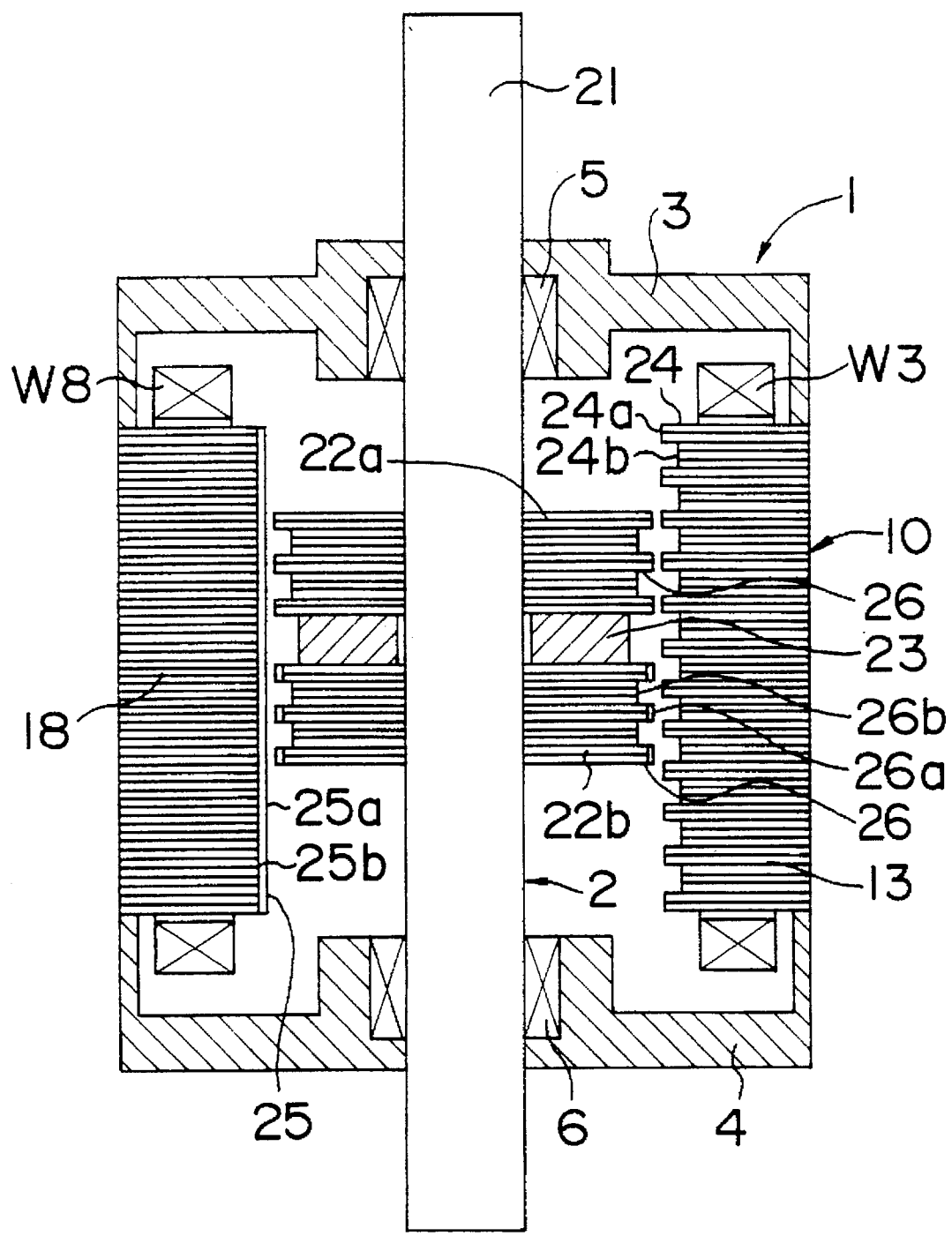
FIG. 2 is a longitudinal sectional view taken along line II—II of FIG. 1.

FIG. 1 is a transverse sectional view illustrating a first embodiment of a combined linear-rotary stepping motor according to the present invention and FIG. 2 is a longitudinal sectional view taken along line II—II of FIG. 1.

In the stepping motor of the embodiment, the number of phases m and numerical values of integers k, b and a are m=5, k=1, b=14 and a=2, and accordingly the number of salient poles is 10 and the number of teeth Zr in the circumferential direction of a mover is 72.

In FIGS. 1 and 2, ten salient poles 11, 12, 13, 14, 15, 16, 17, 18, 19 and 20 are disposed in a stator iron core 10 of a stator 1 radially and inwardly. A plurality of first stator teeth 24 (tooth tops 24a and tooth bottoms 24b) are formed on inner peripheral surfaces of the salient poles 11, 13, 15, 17 and 19 at an equal pitch in the shaft direction and a plurality of second stator teeth 25 (tooth tops 25a and tooth bottoms 25b) are formed on inner peripheral surfaces of the salient poles 12, 14, 16, 18 and 20 at an equal pitch in the circumferential direction. Stator windings W1, W2, W3, . . . W10 are separately wound on the salient poles 11, 12, 13, . . . 20, respectively.

The stator 1 is supported by end brackets 3 and 4 by means of screws not shown.

On the other hand, a mover 2 disposed within the stator 1 is supported by the end brackets 3 and 4 through bearings 5 and 6 movably in the shaft direction and rotatably in the rotation direction. Disposed on a shaft 21 of the mover 2 are magnetic pole iron cores 22a and 22b and a ring-like permanent magnet 23 held between the magnetic pole iron cores 22a and 22b and magnetized in the shaft direction.

Formed on outer peripheral surfaces of the magnetic pole iron cores 22a and 22b are a plurality of mover teeth 26 (tooth tops 26a, tooth bottoms 26b corresponding to the first stator teeth 24 and tooth bottoms 26c corresponding to the second stator teeth 25) at the same equal pitch in the shaft direction in opposing relation to the first stator teeth 24 and at the same equal pitch in the circumferential direction in opposing relation to the second stator teeth 25.

Figure 3:
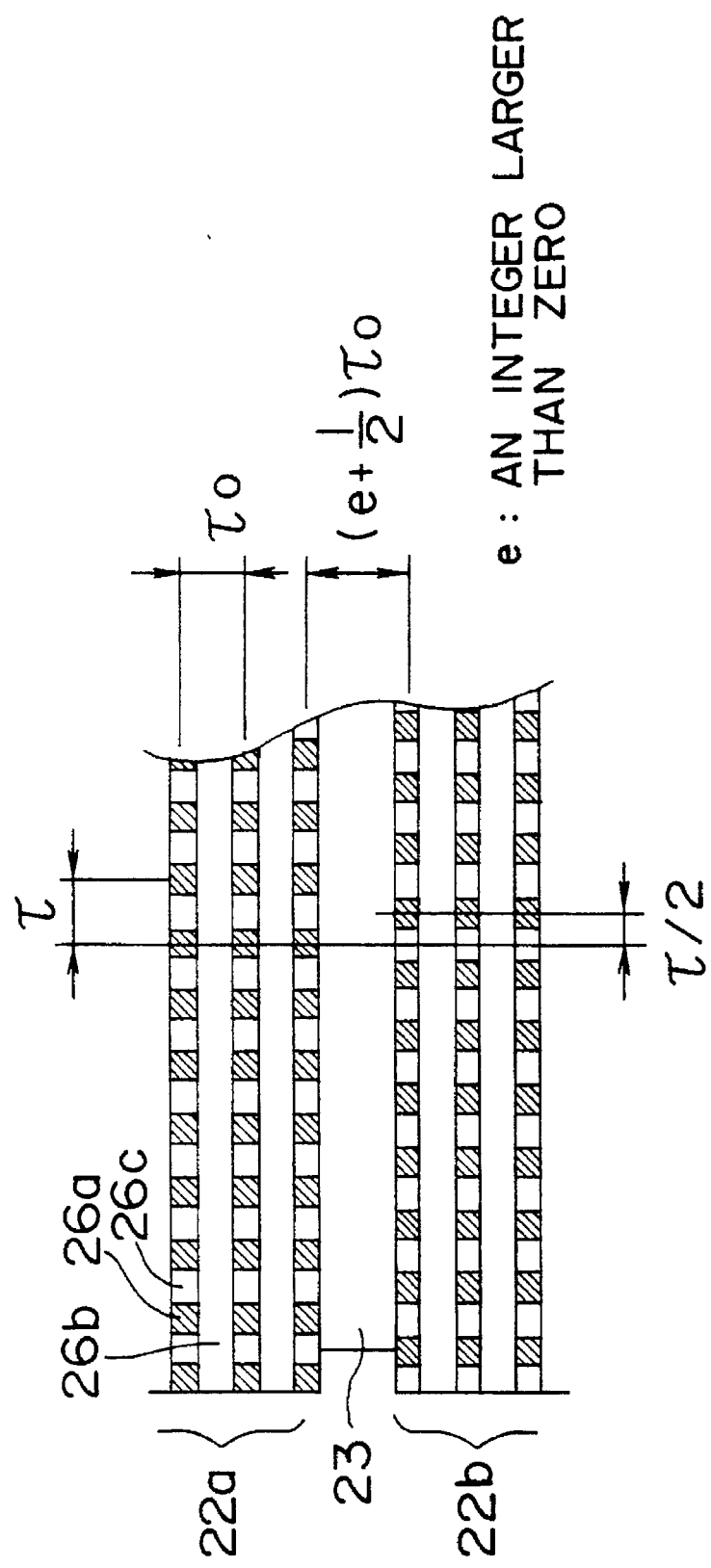
FIG. 3 is an expanded view showing mover teeth formed on outer peripheral surfaces of a mover as viewed from the side of the stator.

FIG. 3 shows the mover teeth 26 formed on the outer peripheral surfaces of the magnetic pole iron cores 22a and 22b as viewed from the side of the stator 1. In FIG. 3, hatched portions represent the tooth tops 26a, blank or unhatched portions 26b represent the tooth bottoms disposed in the shaft direction, and 26c represents the tooth bottoms disposed in the circumferential direction. The tooth pitch $\tau$ of the mover teeth 26 in the circumferential direction is (360/Zr) degrees and the mover teeth 26 of the magnetic pole iron core 22a are shifted from those of the magnetic pole iron core 22b by $\tau/2$ in the circumferential direction.

Further, the length in the shaft direction of the permanent magnet 23 disposed in the mover 2 is set so that the mover teeth 26 disposed in the magnetic pole iron core 22a and the mover teeth 26 disposed in the magnetic pole iron core 22b are shifted from each other by a half of the tooth pitch $\tau_0$ in the shaft direction. In other words, when the tooth tops 26a of the mover teeth 26 disposed in the magnetic pole iron core 22a are opposed to the tooth tops 24a of the stator teeth 24, the tooth tops 26a of the mover teeth 26 disposed in the magnetic pole iron core 22b are opposed to the tooth bottoms 24b of the stator teeth 24.

[Second Embodiment]

Figure 4:
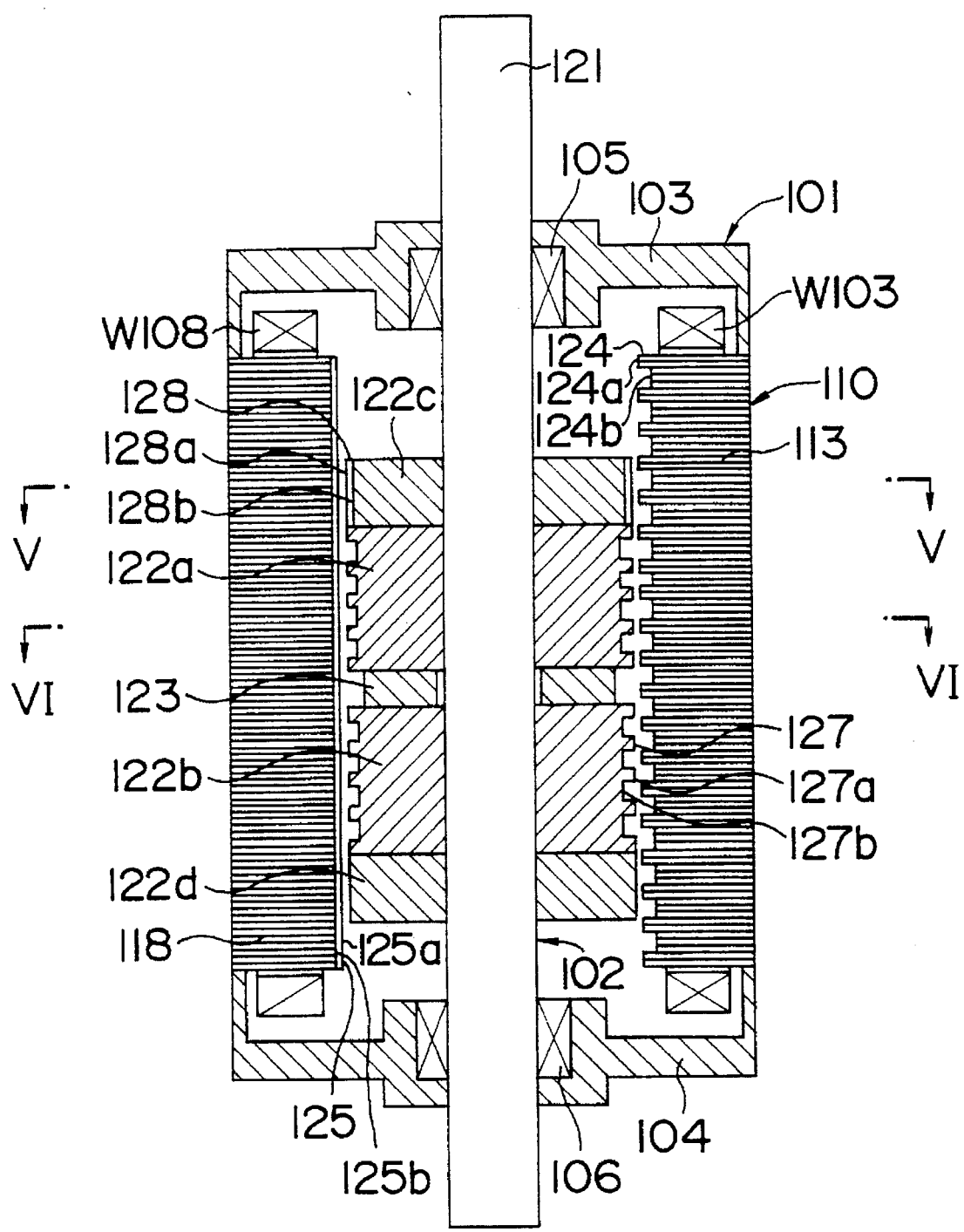
FIG. 4 is a longitudinal sectional view illustrating a second embodiment of a combined linear-rotary stepping motor according to the present invention.
Figure 5:
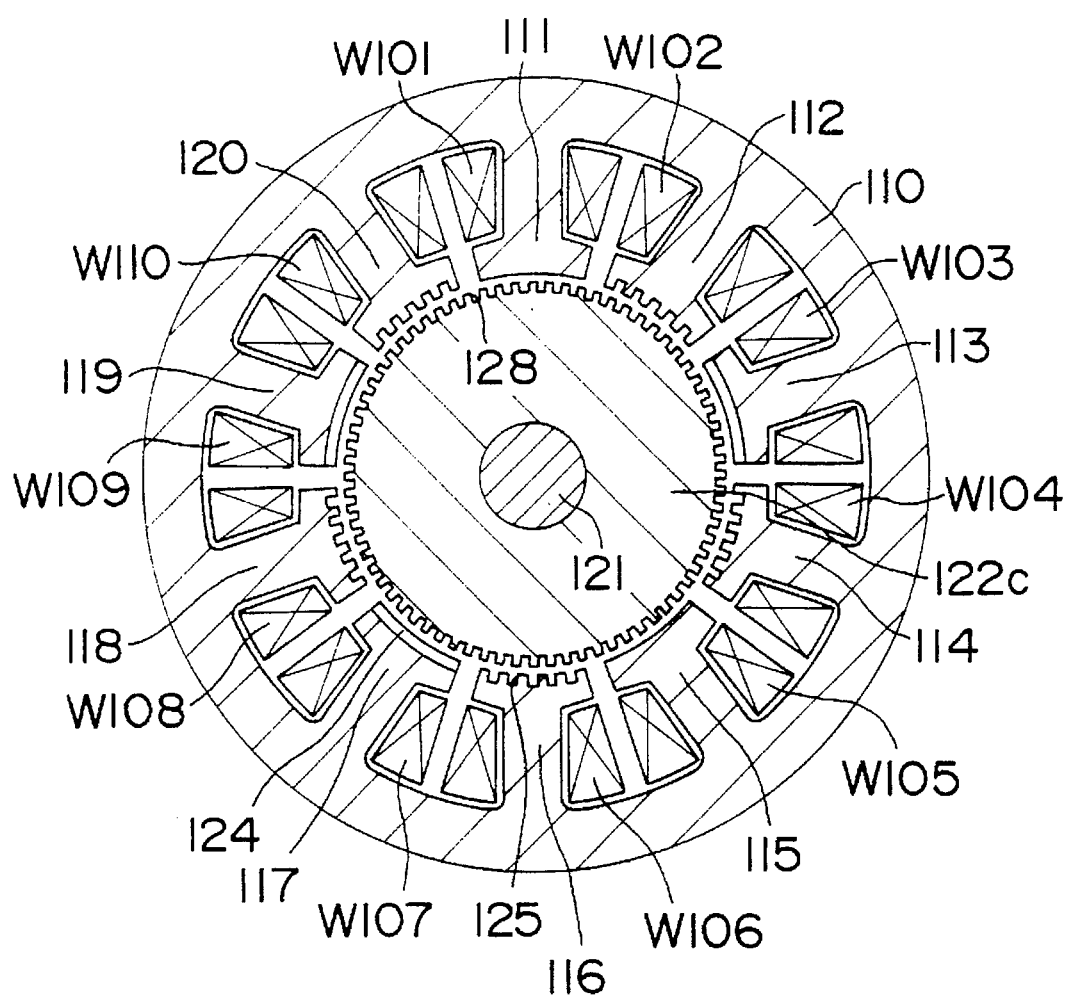
FIG. 5 is a transverse sectional view taken along line V—V of FIG. 4.
Figure 6:
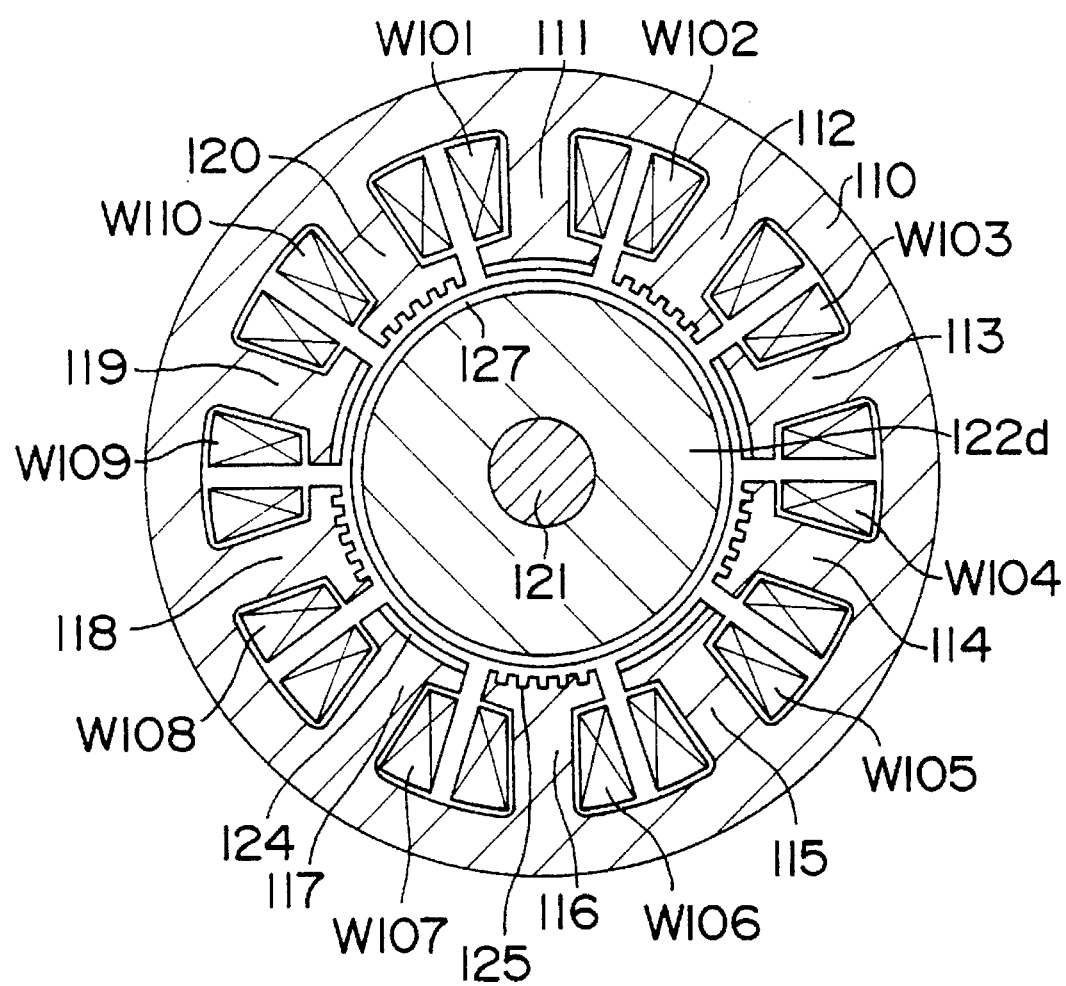
FIG. 6 is a transverse sectional view taken along line VI—VI of FIG. 4.

FIG. 4 is a longitudinal sectional view illustrating a second embodiment of a combined linear-rotary stepping motor according to the present invention and FIGS. 5 and 6 are transverse sectional views taken along lines V—V and VI—VI of FIG. 4, respectively.

In the stepping motor of the embodiment, the number of phases m, numerical values of integers k, b and a are m=5, k=1, b=14 and a=2, and accordingly the number of salient poles 2 km is 10 (2 km=10) and the number of teeth Zr in the circumferential direction of the mover is Zr=k(mb+a)= 72.

In FIGS. 4 to 6, ten salient poles 111, 112, 113, 114, 115, 116, 117, 118, 119 and 120 are disposed in a stator iron core 110 of a stator 101 radially inward. A plurality of first stator teeth 124 (tooth tops 124a and tooth bottoms 124b) are formed on inner peripheral surfaces of the salient poles 111, 113, 115, 117 and 119 at an equal pitch in the shaft direction and a plurality of second stator teeth 125 (tooth tops 125a and tooth bottoms 125b) are formed on inner peripheral surfaces of the salient poles 112, 114, 116, 118 and 120 at an equal pitch in the circumferential direction. Stator windings W101, W102, W103, . . . W110 are separately wound on the salient poles 111, 112, 113, . . . 120, respectively.

The stator 101 is supported by end brackets 103 and 104 by means of screws not shown.

On the other hand, a mover 102 disposed within the stator 101 is supported by the end brackets 103 and 104 through bearings 105 and 106 movably in the shaft direction and rotatably in the rotation direction. A first mover iron core 122a for a linear motor having a plurality of first mover teeth 127 (tooth tops 127a and tooth bottoms 127b) formed at an equal pitch in the shaft direction and a second mover iron core 122c for a rotary motor having Zr second mover teeth 128 (tooth tops 128a and tooth bottoms 128b) formed at an equal pitch in the circumferential direction are disposed on a shaft 121 of the mover 102 to form an integral iron core. Similarly, other first and second mover iron cores 122b and 122d are disposed on the shaft 121 to form an integral iron core. The integral iron core including the iron cores 122a and 122c and the integral iron core including the iron cores 122b and 122d are paired and the pair of integral iron cores are fixedly disposed symmetrically. A ring-like permanent magnet 123 held between the pair of iron cores and magnetized in the shaft direction is fixedly disposed on the shaft 121 of the mover 102.

More particularly, the plurality of first mover teeth 127 (tooth tops 127a and tooth bottoms 127b) are formed on the outer peripheral surfaces of the first mover iron cores 122a and 122b at an equal pitch in the shaft direction in opposing relation to the first stator teeth 124, and the Zr second mover teeth 128 (tooth tops 128a and tooth bottoms 128b) are formed on the outer peripheral surfaces of the second mover iron cores 122c and 122d at an equal pitch in the circumferential direction in opposing relation to the second stator teeth 125.

Accordingly, the first and second mover iron cores 122a and 122c or the other first and second mover iron cores 122b and 122d may be formed into one mover iron core or may be integrally formed by joining separately formed iron cores by means of adhesive agent.

Figure 7:
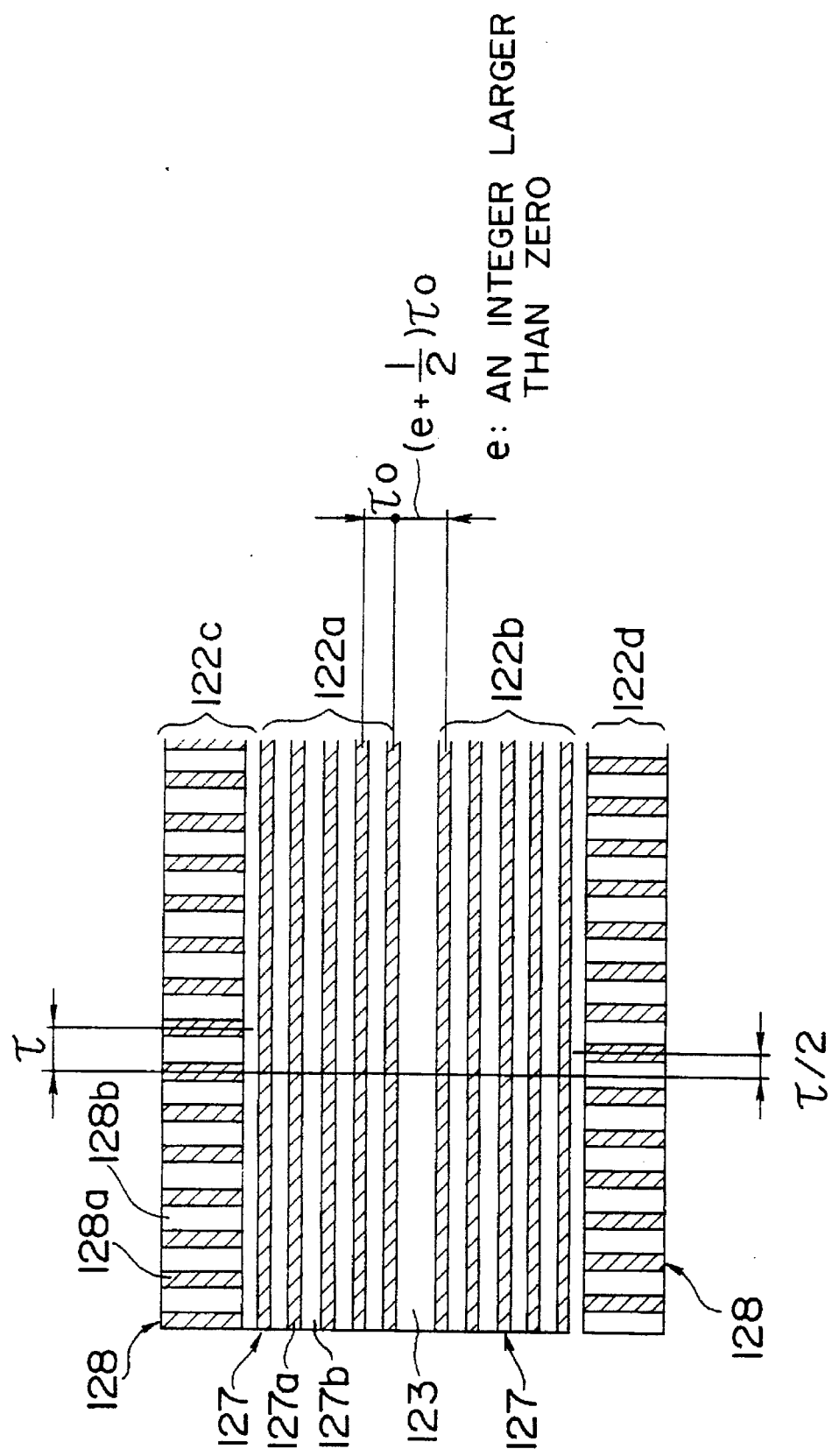
FIG. 7 is an expanded view of first and second mover teeth formed on the outer peripheral surfaces of the mover as viewed from the side of the stator.

FIG. 7 is an expanded view of the first and second mover teeth 127 and 128 formed on the outer peripheral surfaces of the first and second mover iron cores 122a, 122b and 122c, 122d as viewed from the side of the stator 101. Hatched portions represent the tooth tops 127a and 128a and blank or unhatched portions represent the tooth bottoms 127b and 128b. An angle of the tooth pitch in the circumferential direction of the second mover teeth 128 is $\tau$=(360/Zr) and the two second mover iron cores 122c and 122d disposed opposite to each other so that the permanent magnet 123 is interposed therebetween are shifted from each other by $\tau/2$ in the circumferential direction.

Further, the length in the shaft direction of the permanent magnet 123 disposed in the mover 102 is set as apparent from FIG. 4 so that the first mover teeth 127 disposed in the first mover iron core 122a and the first mover teeth 127 disposed in the other first mover iron core 122b are shifted from each other by a half of the tooth pitch $\tau_0$ in the shaft direction. In other words, when the tooth tops 127a of the first mover teeth 127 disposed in the first mover iron core 122a are opposed to the tooth tops 124a of the stator teeth 124, the tooth tops 127a of the first mover teeth 127 disposed in the other first mover iron core 122b are opposed to the tooth bottoms 124b of the stator teeth 124.

Figure 8:
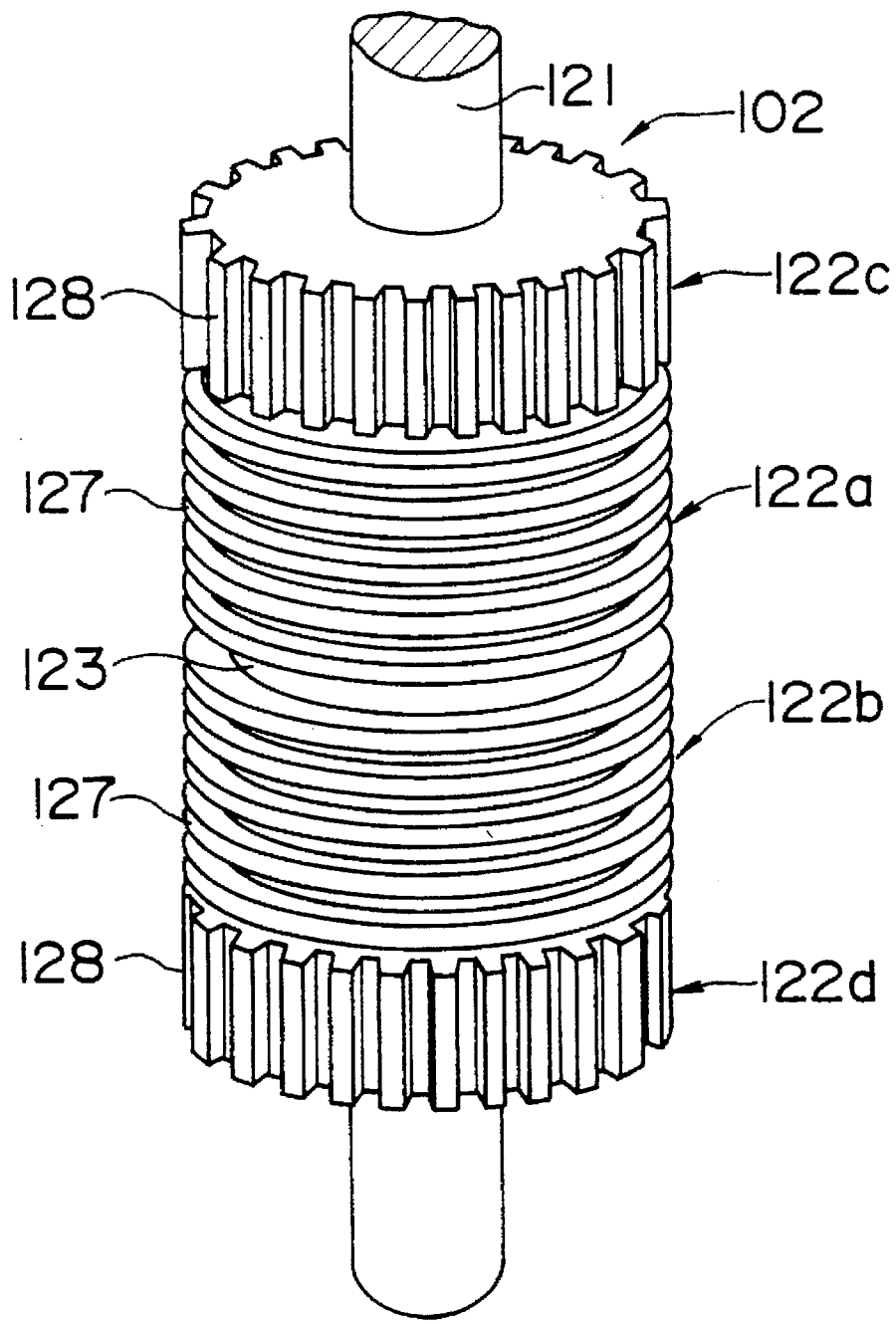
FIG. 8 is a perspective view showing a shape of mover iron cores.

FIG. 8 is a perspective view showing a shape of the iron cores for the mover 102. That is, the second mover iron cores 122c and 122d having the second mover teeth 128 formed in the circumferential direction and the first mover iron cores 122a and 122b having the first mover teeth 127 formed in the shaft direction are disposed in the shaft direction.

Figure 9:
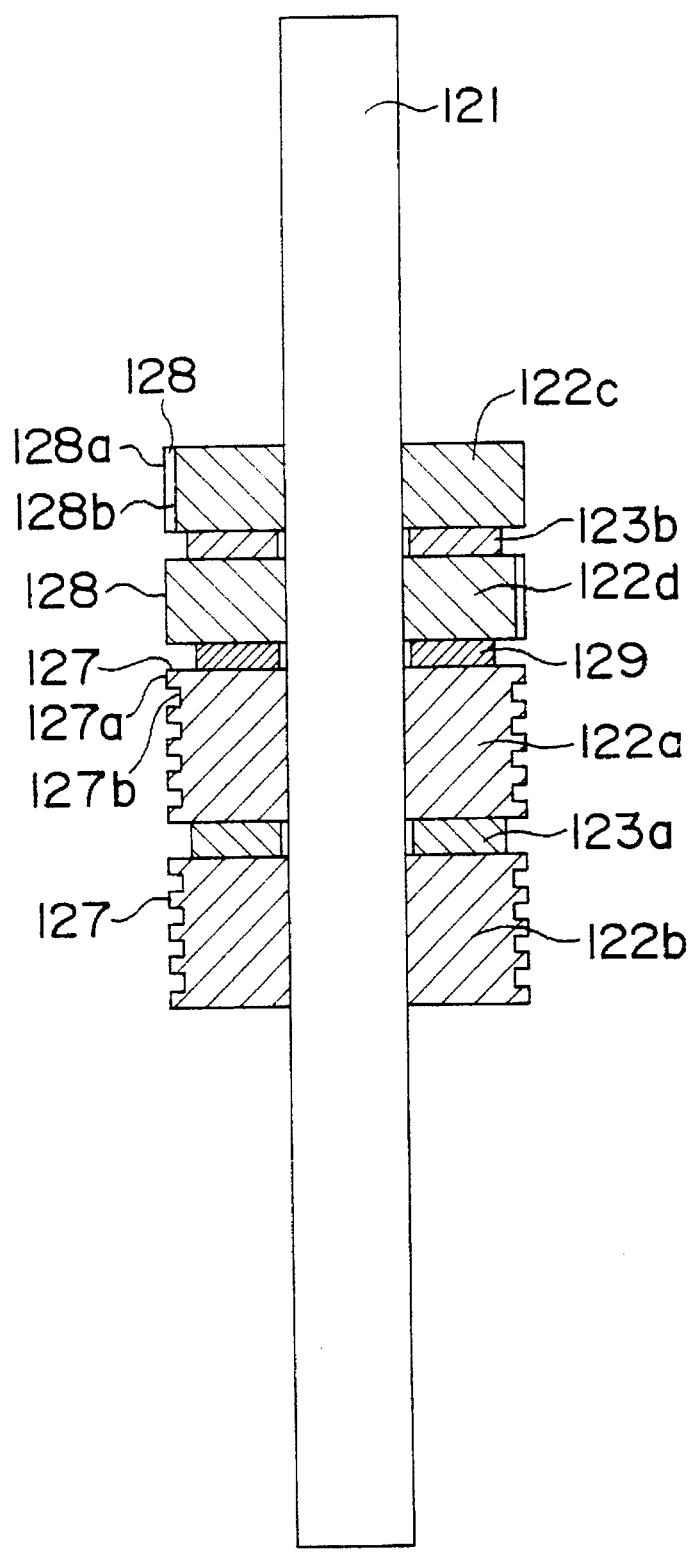
FIG. 9 is a longitudinal sectional view showing another example of mover iron cores.

FIG. 9 is a longitudinal sectional view showing another example of the iron cores for the mover 102. In FIG. 9, the two first mover iron cores 122a and 122b each having the plurality of first mover teeth 127 formed in the shaft direction and a permanent magnet 123a held between the two first mover iron cores 122a and 122b and magnetized in the shaft direction constitute a mover portion for a linear motor and the two second mover iron cores 122c and 122d each having the plurality of second mover teeth 128 formed in the circumferential direction and a permanent magnet 123b held between the two second mover iron cores 122c and 122d and magnetized in the shaft direction constitute a mover portion for a rotary motor. The mover portions for the linear motor and the rotary motor are fixedly disposed on the shaft 121 so that a nonmagnetic spacer 129 is held therebetween.

[Third Embodiment]

The third embodiment is related and applied to the first and second embodiments and is described by using the reference numerals in the drawings of the first embodiment for the simplicity of description. Accordingly, with regard to the second embodiment, reference numerals in the third embodiment are required to be added with a hundred. However, when required particularly, the reference numerals of the second embodiment are described together.

Figure 10A:
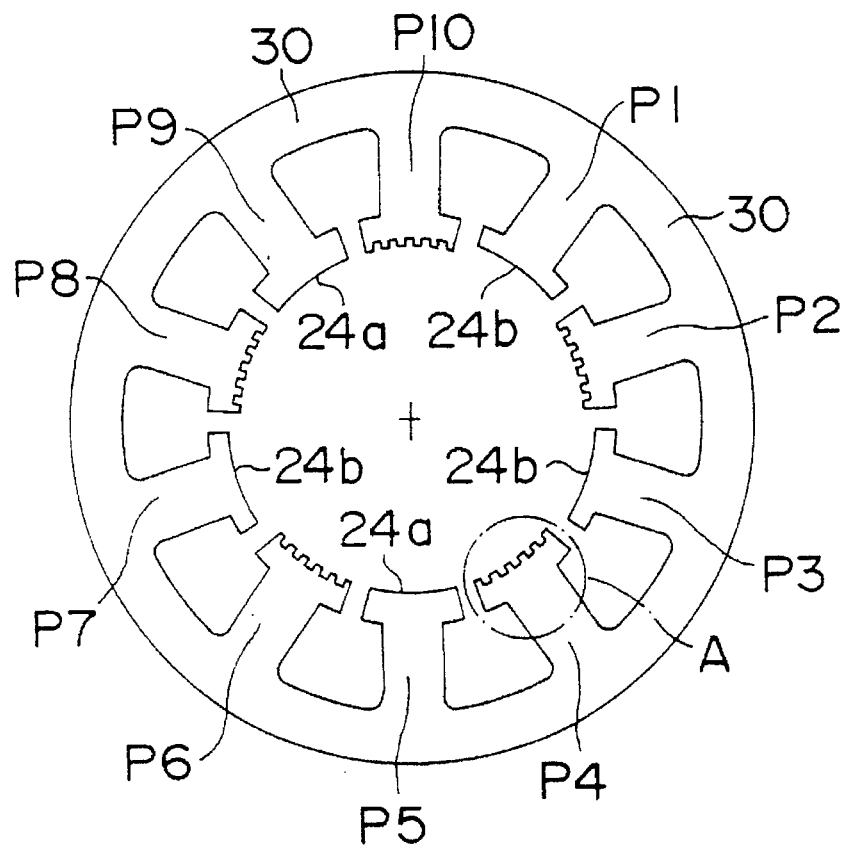
Figure 10B:
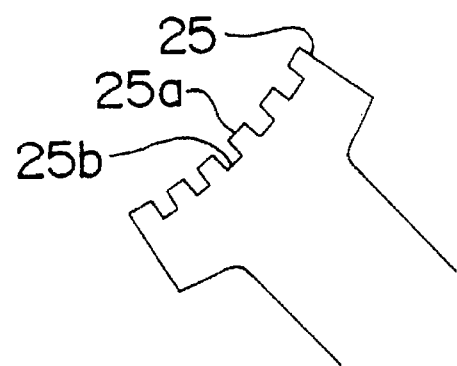

FIGS. 10(a) and 10(b) show an example of a stator iron plate 30 forming the stator iron core 10 and FIG. 10(b) is an enlarged view of a portion designated by A of FIG. 10(a). In FIG. 10(a), salient poles P5 and P9 of the stator iron plate 30 have a small inner radius and form the tooth tops 24a of the first stator teeth 24 in the shaft direction. Further, salient poles P1, P3 and P7 have a large inner radius and form the tooth bottoms 24b of the first stator teeth 24 in the shaft direction. Salient poles P2, P4, P6, P8 and P10 form the second stator teeth 25 in the circumferential direction. Center lines of the salient poles P2, P4, P6, P8 and P10 are disposed at an equal pitch of (360/km) degrees or 72 degrees in the circumferential direction. Six second teeth 25 are disposed in each of the salient poles symmetrically to the center line of each of the salient poles.

FIG. 11 is an expanded view of the first and second stator teeth 24 and 25 of the salient poles 11, 12, 13, ... 20 formed when the stator iron plates 30 are laminated while each of the stator iron plates is rotated by a double angle of the equal pitch angle (72 degrees) of the salient poles P2, P4, P6, P8 and P10 as viewed from the mover 2. Hatched portions represent the tooth tops 24a and 25a and blank or unhatched portions represent the tooth bottoms 24b and 25b.

When the number Zr of the mover teeth in the circumferential of the second mover iron cores 122c, 122d of the mover 2 or the mover 102 satisfies Zr=k(mb+a) where b is an integer equal to or larger than 1, a is an odd number satisfying $1 \leq a < 2m$ when m is an even number and a is an integer satisfying $1 \leq a < m$ or $m < a < 2m$ when m is an odd number, the salient poles P2, P4, P6, P8 and P10 of the stator iron plate 30 having the second stator teeth 25 in the circumferential direction can be disposed uniformly as described above and accordingly the stator iron plates 30 can be laminated while rotated by an angle equal to several times of 72 degrees.

Figure 12:
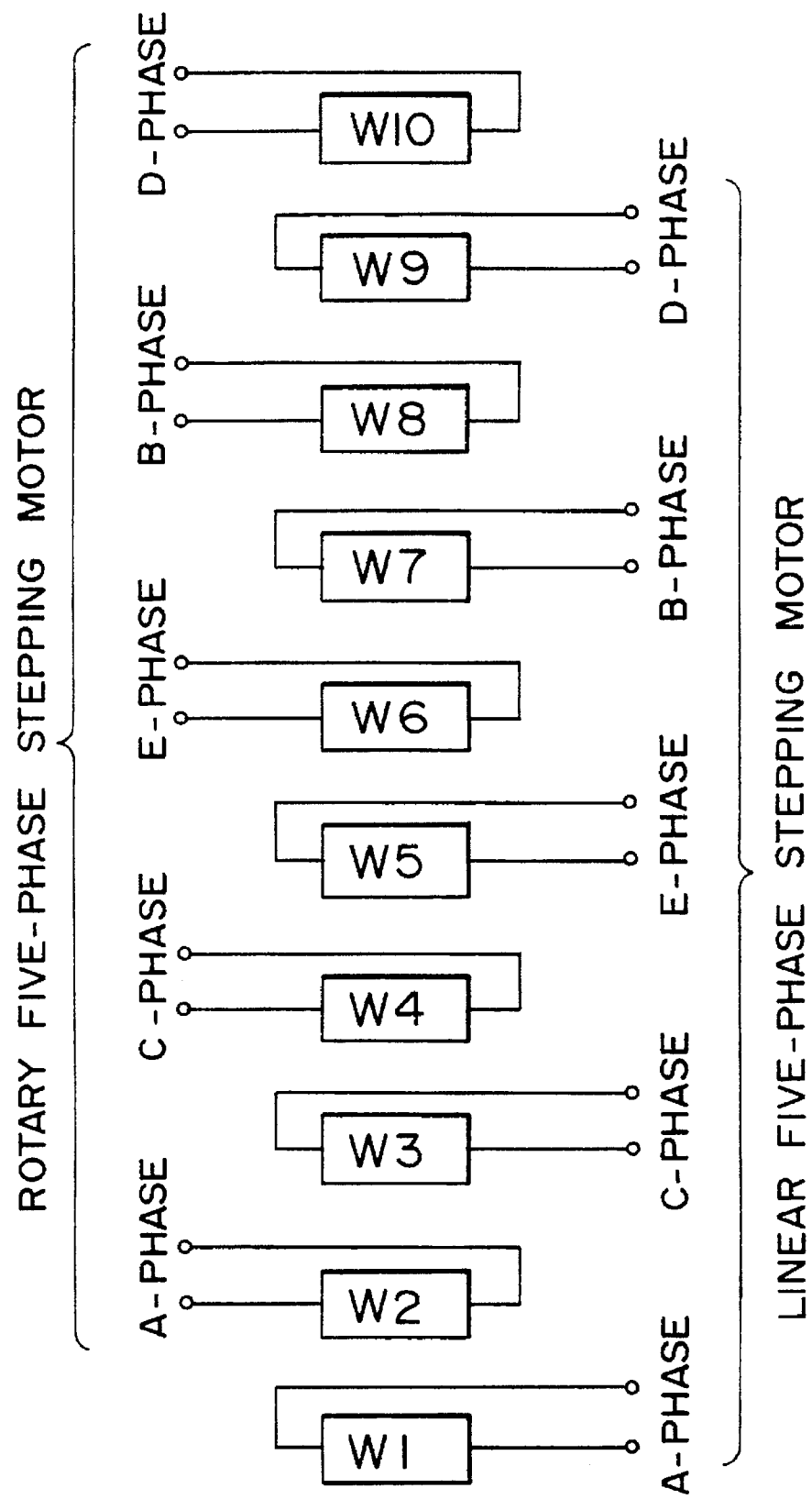
FIG. 12 is a connection diagram of stator windings of the five-phase combined linear-rotary stepping motor in FIG. 11.

When the second stator teeth 25 of the salient pole 12 are just opposed to the mover teeth 26 in the circumferential direction, the second stator teeth 25 of the salient pole 14 are shifted from the mover teeth 26 by 2/5 of the tooth pitch τ, the second stator teeth 25 of the salient pole 16 shifted by 4/5, the second stator teeth 25 of the salient pole 18 shifted by 6/5 or 1/5, and the second stator teeth 25 of the salient pole 20 shifted by 8/5 or 3/5. Accordingly, as shown in FIG. 12, by setting the stator windings W2, W8, W4, W10 and W6 to A-, B-, C-, D- and E-phases, respectively, a rotary five-phase stepping motor having a basic step angle equal to 1/10 degree of the tooth pitch τ, that is, 0.5 degree can be configured.

Further, when a thickness of the stator iron plate 30 is set to $t_0$ and the iron plates 30 are laminated while rotated by 144 degrees as described above, the first stator teeth 24 having a tooth pitch in the shaft direction of $m \cdot t_0$ or $5t_0$ and a tooth thickness of the tooth tops 24a of $2t_0$ are formed in the stator salient poles 11, 13, 15, 17 and 19 in the shaft direction as shown in FIG. 11. Furthermore, the first stator teeth 24 of the salient pole 13 are shifted by 2/5 of the tooth pitch with respect to the salient pole 11, the teeth 24 of the salient pole 15 shifted by 4/5, the teeth 24 of the salient pole 17 shifted by 6/5 or 1/5, and the teeth 24 of the salient pole 19 shifted by 8/5 or 3/5. Accordingly, when the stator windings W1, W7, W3, W9 and W5 are set to A-, B-, C-, D- and E-phases, respectively, a linear five-phase stepping motor having a basic amount of movement of $t_0/2$ can be configured.

Thus, the combined linear-rotary five-phase stepping motor can be configured and each motor portion thereof can be controlled individually.

Further, the stator iron core 10 can be formed as described below instead of lamination and rotation of the stator iron plates 30 by 144 degrees.

FIGS. 13(a) to 13(e) show examples of stator iron plates 30a, 30b, 30c, 30d and 30e having salient poles P1, P3, P5, P7 and P9 forming the first stator teeth 24 in the shaft direction of the stator iron core 10. Salient poles P2, P4, P6, P8 and P10 include second stator teeth 25 formed thereon in the circumferential direction. In FIGS. 13(a) to 13(e), the tips of the salient poles P1, P3, P5, P7 and P9 of the stator iron plates 30a, 30b, ... 30e are punched in accordance with a periodically repeated order by movable punches included in a punching mold not shown and disposed to be able to be pushed out and withdrawn in each of the salient poles P1, P3, ... P9 to be formed into shapes as shown in (a), (b), (c), (d), (e), (a), (b), (c), ... of FIG. 13 for each punching of the iron plate, so that the tooth tops 24a or the tooth bottoms 24b of the first stator teeth 24 are formed at the tips of the salient poles P1, P3, ... P9.

Figure 13A:
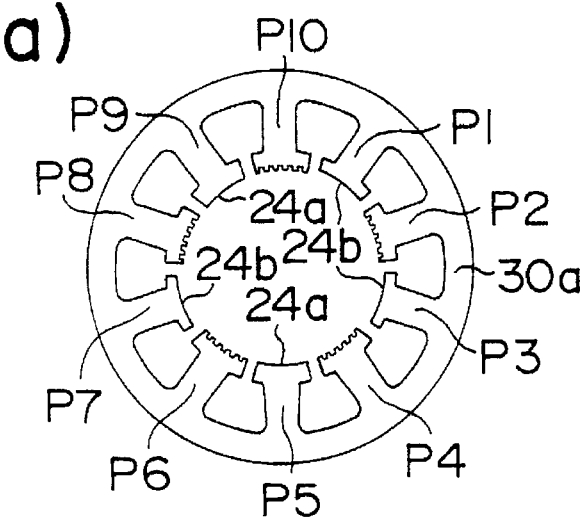
FIG. 13(a)–13(e) are plan views of stator iron plates forming the stator iron core and show examples of tooth tops or tooth bottoms formed at tips of the salient poles for forming the stator teeth.

The stator iron plate 30a shown in FIG. 13(a) is punched by setting movable punches 5 and 9 pertinent to the salient poles P5 and P9 to a non-operating state and setting movable punches 1, 3, and 7 pertinent to other salient poles P1, P3 and P7 to an operating state so that the tooth tops 24a are formed at the tips of the salient poles P5 and P9 and the tooth bottoms 24b are formed at the tips of the salient poles P1, P3 and P7.

Figure 13B:
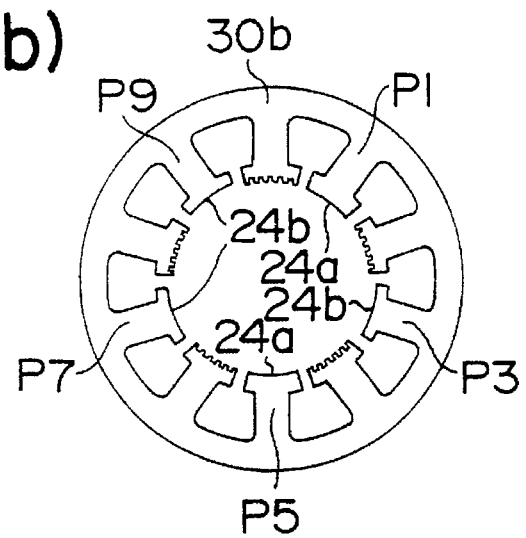

The stator iron plate 30b shown in FIG. 13(b) is punched by setting the movable punches 1 and 5 pertinent to the salient poles P1 and P5 to the non-operating state and setting the movable punches 3, 7 and 9 pertinent to other salient poles P3, P7 and P9 to the operating state so that the tooth tops 24a are formed at the tips of the salient poles P1 and P5 and the tooth bottoms 24b are formed at the tips of the salient poles P3, P7 and P9.

Figure 13C:
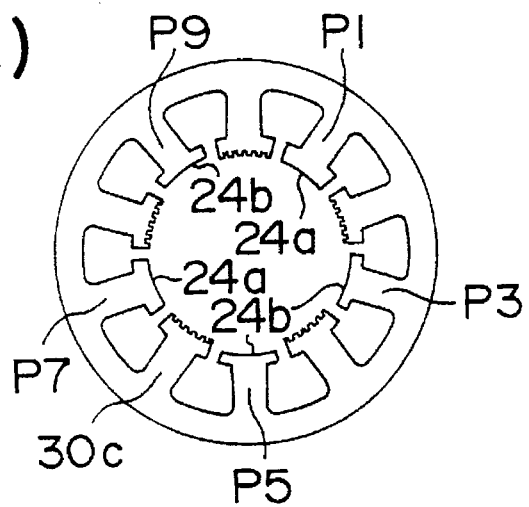
Figure 13D:
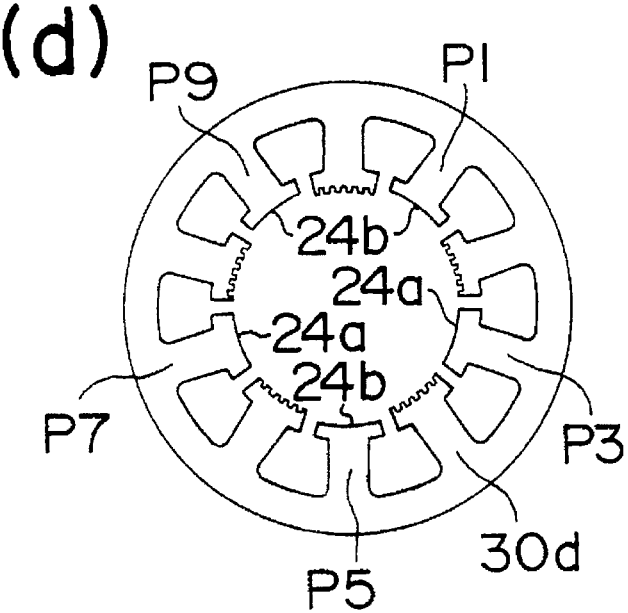
Figure 13E:
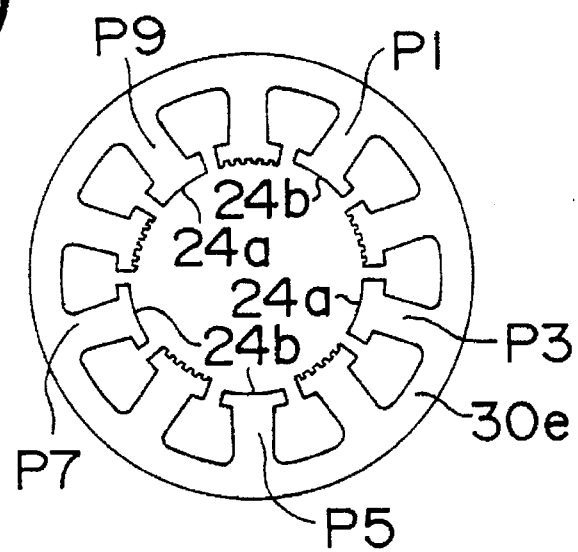

Similarly, stator iron plates 30c, 30d and 30e shown in FIGS. 13(c), 13(d) and 13(e) are punched by setting the movable punches 1, 3, ... 9 pertinent to the salient poles P1, P3, ... P9 to the non-operating state or the operating state selectively so that the predetermined tooth tops 24a or tooth bottoms 24b are formed at the tips of the salient poles P1, P3, ... P9.

Accordingly, when the stator iron core 10 is formed, the punched stator iron plates 30a, 30b, 30c, 30d and 30e are laminated in the order of the description thereof, so that the first stator teeth 24 for one pitch can be formed at the tips of the salient poles P1, P3, ... P9.

Figure 16:
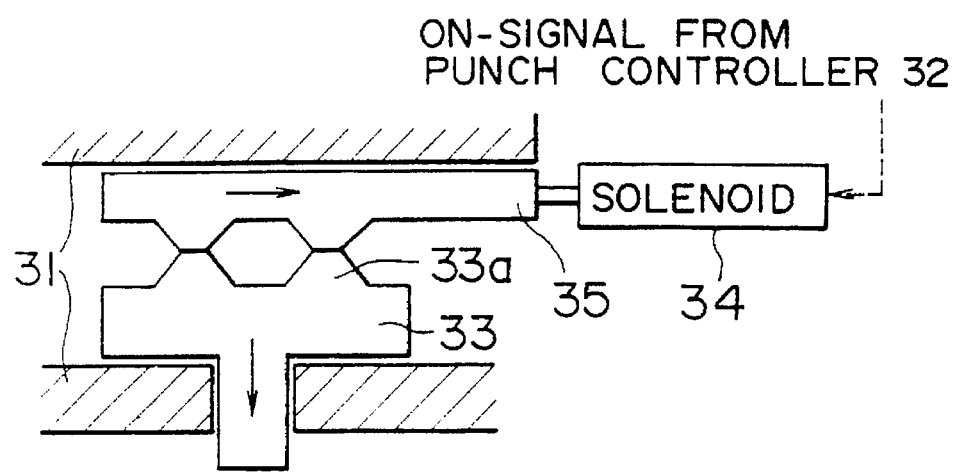
Figure 16:
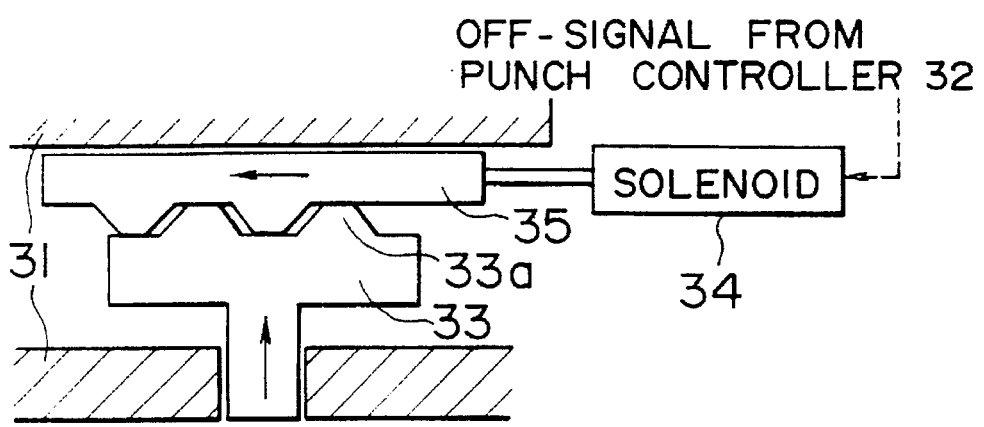

FIGS. 14 to 16 illustrate a procedure of punching the stator iron plates 30a, 30b, 30c, 30d and 30e by a punching mold and laminating the punched stator iron plates successively in order to form the stator iron plate 10.

FIG. 14 is a schematic diagram illustrating a portion for controlling movable punches of a punching mold. In FIG. 14, the movable punches 1, 3, 5, . . . 9 included in the punching mold 31 and disposed to be able to be pushed out and withdrawn or be protruded and returned in each of the salient poles P1, P3, P5, . . . P9 are controlled to be pushed out and withdrawn by driving solenoids selectively in the order of FIG. 15 by a punch controller 32 so that the tooth tops 24a or the tooth bottoms 24b of the first stator teeth 24 are formed at the tips of the salient poles P1, P2, P5, . . . P9 of the stator iron plates 30 constituting the stator iron plate 10. In FIG. 14, numeral 32a denotes connecting leads.

FIG. 15 is a diagram showing a relation of a punching and laminating order of the stator iron plates 30a, 30b, 30c, 30d and 30e and control states of the movable punches 1, 3, 5, . . . 9. In operation of the movable punches 1, 3, 5, . . . 9 of FIG. 15, mark ● represents the operating state of the punch (the punch is pushed out) for forming the tooth bottom 24b and mark ○ represents the non-operating state of the punch (the punch is withdrawn) for forming the tooth top 24a.

FIGS. 16(a) and 16(b) are diagrams for easily understanding the control states of a movable punch 33 which is one of the movable punches 1, 3, 5, . . . 9. FIG. 16(a) shows its operating state and FIG. 16(b) shows its non-operating state.

In FIGS. 16(a) and 16(b), the movable punch 33 is disposed in the punching mold 31 movably in the vertical direction and includes a cam 33a formed on an upper surface thereof and which abuts against a cam member 35 which is driven in the right direction in FIG. 16(a) and 16(b) by means of energization of the solenoid 34.

When an ON signal from the punch controller 32 is supplied to the solenoid 34, the solenoid 34 is energized to drive the cam member 35 in the right direction. When a protrusion of the cam member 35 abuts against a protrusion of the cam 33a of the movable punch 33 by driving of the cam member 35, the movable punch 33 is protruded from the surface of the punching mold 31 and assumes in the operating state shown in FIG. 16(a).

Further, when an OFF signal from the punch controller is supplied to the solenoid 34, the solenoid 34 is disenergized to return the cam member 35 in the left direction by means of returning means not shown. When the cam member 35 is returned, the protrusions of both the cams are disengaged and the movable punch 33 is retracted from the surface of the punching mold 31 by means of returning means not shown to assume the non-operating state shown in FIG. 16(b).

The stator iron plate 10 can be formed by successively laminating the stator iron plate 30a, 30b, 30c, 30d and 30e punched as described above in the laminating order shown in FIG. 15.

Figure 17:
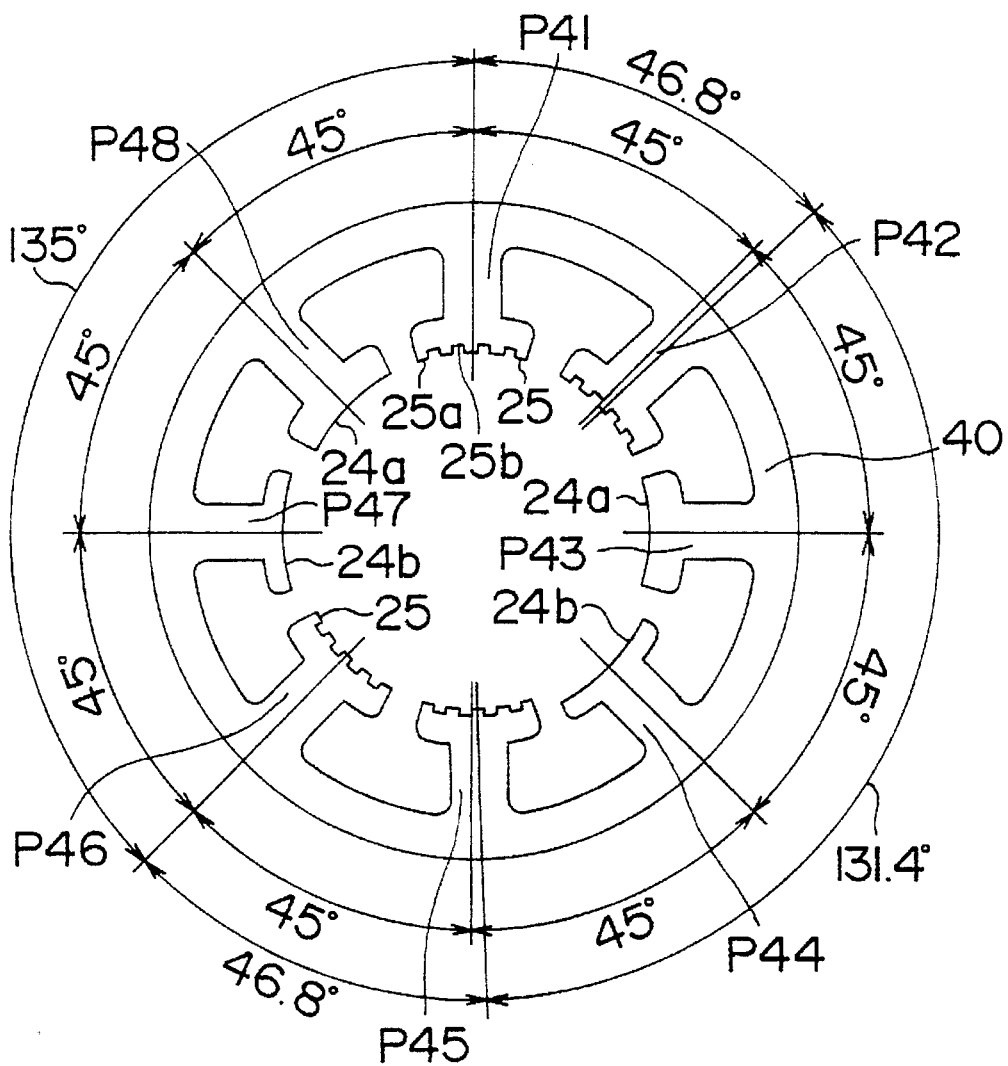
FIG. 17 is a plan view of a stator iron plate forming a stator iron core showing another example of the embodiment.

FIG. 17 shows an example of a stator iron plate 40 constituting the stator iron core 10 used in another example of the combined linear-rotary stepping motor of the embodiment. In FIG. 17, the stator iron plate 40 has the number of phases m=2 for the linear motor portion and the number of phases n=2 for the rotary motor portion and includes 2(m+n)=8 salient poles P41, P42, P43, . . . P48 formed at an equal pitch angle of 45 degrees.

In the stator iron plate 40, the salient poles P41, P42 and P45, P46 are paired, respectively, and include second stator teeth 25 formed in the circumferential direction. The salient poles P43, P44 and P47, P48 are paired, respectively, and include first stator teeth 24 formed in the shaft direction. An angle between center lines of the second stator teeth 25 foiled in the salient poles P41 and P42 is 46.8 degrees and an angle between center lines of the second stator teeth 25 formed in the salient poles P42 and P45 is 131.4 degrees. Further, an angle between center lines of the second stator teeth 25 formed in the salient poles P45 and P46 is 46.8 degrees. In addition, the number of mover teeth Zr disposed in the circumferential direction of the mover 2 or the second mover iron core 122c, 122d not shown is 50.

Accordingly, when it is assumed that the second stator teeth 25 of the salient pole P41 are opposed to the mover teeth 26 of the mover 2 or the teeth 128 of the second mover iron core of the mover 102, the teeth 25 of the salient pole P42 are shifted from the mover teeth 26 or the teeth 128 of the second mover iron core by $\frac{2}{4}$ of the tooth pitch (7.2 degrees), and stator windings wound on the salient poles P41 and P42 are connected so that the salient poles P41 and P42 have different polarities from each other when the stator windings wound on the salient poles P41 and P42 are energized, to thereby be able to constitute one phase. Further, the teeth 25 of the salient pole P45 are shifted from the mover teeth 26 or the teeth 128 of the second mover iron core by $\frac{1}{4}$ of the tooth pitch, the teeth 25 of the salient poles P46 are shifted from the mover teeth 26 or the teeth 128 of the second mover iron core by $\frac{3}{4}$ of the tooth pitch, and the teeth of the salient pole P45 are shifted from the teeth 25 of the salient pole P46 by $\frac{2}{4}$ of the tooth pitch. Accordingly, when stator windings wound on the salient poles P45 and P46 are energized, the stator windings are connected so that the salient poles P45 and P46 have different polarities from each other to thereby be able to constitute one phase, so that the mover can be formed as shown in FIGS. 2 and 3 or 4 and 7 to thereby constitute a hybrid rotary two-phase stepping motor having a basic step angle of 1.8 degrees.

Figure 18:
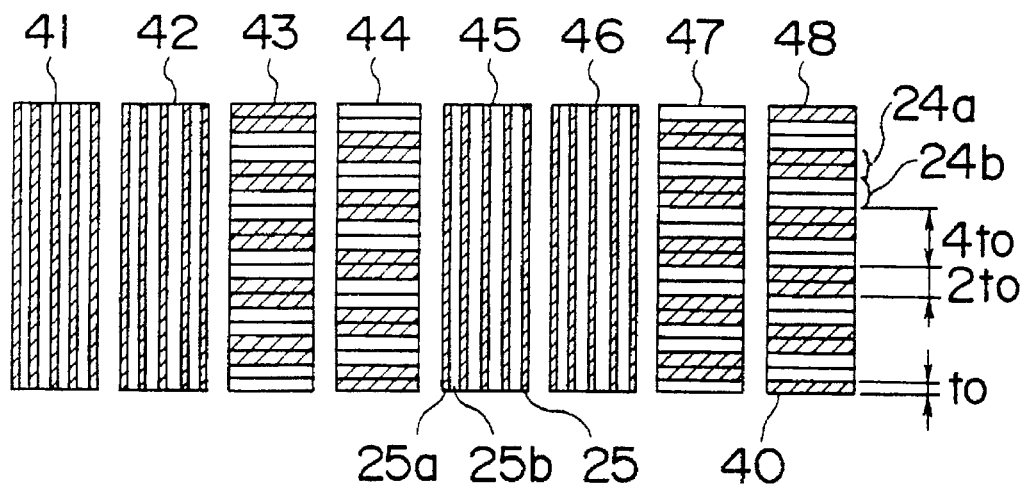
FIG. 18 is an expanded view showing the first and second stator teeth formed by punching the stator iron plates of FIG. 17 in the predetermined order using a punching mold including movable punches in each of the salient poles while controlling to push out and withdraw the movable punches as viewed from the side of the mover.

FIG. 18 shows the first and second stator teeth 24 and 25 of the salient poles 41, 42, 43, . . . 48 formed by punching and laminating the tips of the salient poles P43, P44, P47 and P48 of the stator iron plates 40 while the movable punches included in a punching mold in corresponding manner to the salient poles P43, P44, P47 and P48 are controlled to assume the operating state as the punch or the non-operating state as the punch by the punch controller 32 so that the tips of the salient poles P43, P44, P47 and P48 constitute the tooth tops 24a or 24b periodically upon punching the stator iron plates 40 as viewed from the side of the mover 2.

Figure 19:
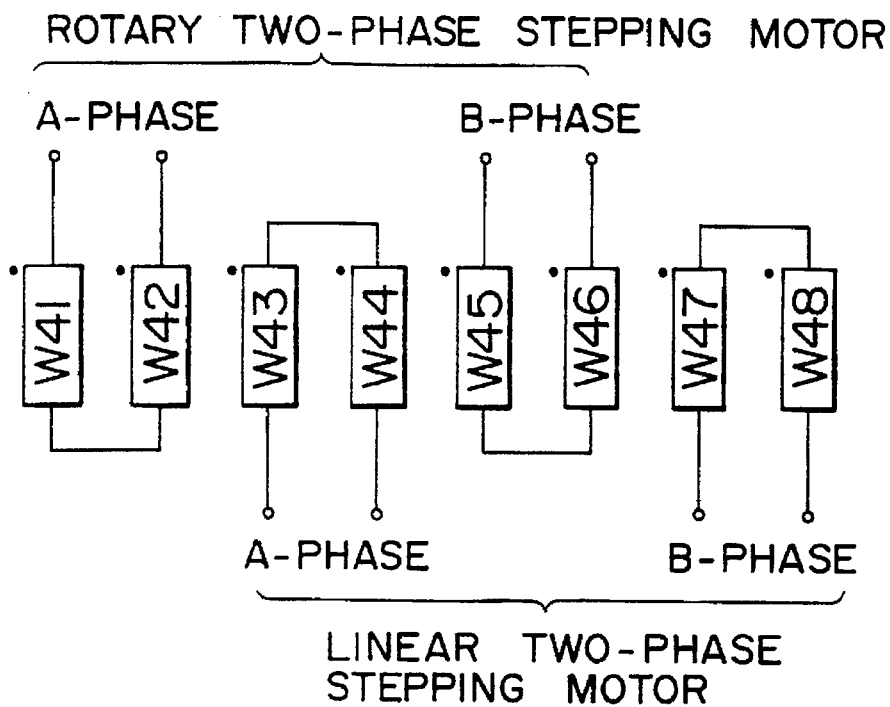
FIG. 19 is a connection diagram of stator windings of a two-phase combined linear-rotary stepping motor of FIG. 18.

Hatched portions represent the tooth tops 24a and 25a and blank or unhatched portions represent the tooth bottoms 24b and 25b. When the thickness of the stator iron plate 40 is $t_0$ and the stator iron plates 40 are laminated as described above, the first stator teeth 24 having the tooth pitch of $2mt_0$ or $4t_0$ and the tooth thickness of $2t_0$ in the shaft direction are formed in the stator salient poles 43, 44, 47 and 48 in the shaft direction. Furthermore, the teeth 24 of the salient pole 44 are shifted from the salient pole 43 by $\frac{2}{4}$ of the tooth pitch, the teeth of the salient pole 47 are shifted from the salient pole 43 by $\frac{1}{4}$ of the tooth pitch and the teeth 24 of the salient pole 48 are shifted from the salient pole 43 by $\frac{3}{4}$ of the tooth pitch. Accordingly, by connecting the stator windings W41, W42, W43, . . . W48 as shown in FIG. 19, a hybrid type linear two-phase stepping motor having the basic amount of movement of $t_0$ can be configured.

As described above, in the embodiment, the combined linear-rotary two-phase stepping motor can be configured. Thus, by structuring one phase by each pair of the adjust salient poles 41 and 42; 43 and 44; 45 and 46; and 47 and 48 as described above, the magnetic circuits for each phase can be independent of each other and at the same time the magnetic circuits of the linear motor portion and the rotary motor portion can be independent of each other to reduce coupling between phase windings.

In the embodiments, the hybrid type stepping motor has been described, while the present invention can be applied to the variable reluctance type stepping motor similarly.

The technique of the present invention is not limited to the technique of the embodiments and may be another means for performing the same function. Further, the technique of the present invention can be varied and added to variously within the scope of the above configuration.

As apparent from the description of the first and third embodiment, according to the combined linear-rotary stepping motor of the present invention, there are provided the stator including the stator iron core having the plurality of salient poles of two kinds disposed radially inward, the salient poles of one kind having the plurality of first stator teeth formed in the inner peripheral surface thereof in the shaft direction and salient poles of the other kinds having the plurality of second stator teeth formed in the inner peripheral surface thereof in the circumferential direction, and the mover including the mover iron core supported within the stator movably in the shaft direction and rotatably in the rotation direction and having the plurality of mover teeth formed in the outer peripheral surface thereof at an equal pitch in the shaft direction and the circumferential direction in opposing relation to the first and second stator teeth.

Thus, since the stator iron core may be formed by rotating by the predetermined angle and laminating the stator iron plates or punching the iron plates forming the iron core by the punching mold while controlling to push out and withdraw the movable punches included in the punching mold and disposed to be able to be pushed out or withdrawn in each of the salient poles at the predetermined period for each punching of the iron plates and laminating the punched iron plates successively, the length in the shaft direction need not be lengthened and the stator iron plates and the mover iron core for the linear motor portion and the rotary motor portion can be shared.

Accordingly, the assembling work efficiency of the whole stepping motor is improved.

Apparent from the description of the second and third embodiments, according to the combined linear-rotary stepping motor of the present invention, in since the stator iron core is formed by laminating the stator iron plates having the salient poles constituting the tooth tops and the salient poles constituting the tooth bottoms of the teeth, which are disposed in the predetermined relation, while rotating the stator iron plates by the predetermined angle determined by the number of phases, the number of salient poles and the predetermined relation so that the first stator teeth are formed in the inner peripheral surfaces of the salient poles in the shaft direction and at the same time the second stator teeth are laminated while rotated by the predetermined angle to thereby laminate the tooth tops and the tooth bottoms, the stator iron plates and the mover iron core can be shared and the ratio of the mover for the linear motor portion and the rotary motor can be set to any value.

Further, in since the stator iron core can be formed by punching the iron plates constituting the iron core by the punching mold while controlling to selectively push out and withdraw the movable punches included within the punching mold and disposed to be able to be pushed out and withdrawn in each of the salient poles so that the tips of the salient poles constitute the tooth tops or the tooth bottoms of the first stator teeth at the predetermined period for each punching of the iron plate and laminating the punched iron plates successively in order to form the first stator teeth in the inner peripheral surface of the salient pole in the shaft direction, the stator iron plates and the mover iron core can be shared and the ratio of the mover for the linear motor portion and the rotary motor portion can be set to any value.

The manufacturing method of the stator iron core is described and the stator iron plates of cm kinds can be laminated successively repeatedly to thereby form the first stator teeth of the linear motor portion. In this case, the manufacturing method of the stator iron plates of cm kinds is not limited specifically and iron plates punched by different punching molds may be laminated successively.

Accordingly, the assembling work efficiency of the whole stepping motor is improved.

We claim:

1. A combined linear-rotary stepping motor comprising a stator including a stator iron core having a plurality of salient poles of two kinds disposed radially inward, said two kinds being alternately arranged in a circumferential direction, said salient poles of one kind having a plurality of first stator teeth formed in an inner peripheral surface thereof in the shaft direction, said salient poles of the other kind having a plurality of second stator teeth formed in an inner peripheral surface thereof in the circumferential direction and a mover including a mover iron core supported within said stator movably in the shaft direction and rotatably in the rotation direction and having a plurality of mover teeth formed in an outer peripheral surface thereof at an equal pitch in the shaft direction and the circumferential direction in opposing relation to said first and second stator teeth, said stator iron core being defined by laminated stator iron plates including said salient poles constituting tooth tops of said teeth and said salient poles constituting tooth bottoms of said teeth, which are disposed in a predetermined relation, successive ones of said stator iron plates being rotationally displaced from one another by a predetermined angle determined by the number of phases, the number of salient poles and the predetermined relation so that said first stator teeth are formed in the inner peripheral surface of said salient pole in the shaft direction.

2. A combined linear-rotary stepping motor comprising a stator including a stator iron core having a plurality of salient poles of two kinds disposed radially inward, said two kinds being alternately arranged in a circumferential direction, said salient poles of one kind having a plurality of first stator teeth formed in an inner peripheral surface thereof in the shaft direction, said salient poles of the other kind having a plurality of second stator teeth formed in an inner peripheral surface thereof in the circumferential direction and a mover including a mover iron core supported within said stator movably in the shaft direction and rotatably in the rotation direction and having a plurality of mover teeth formed in an outer peripheral surface thereof at an equal pitch in the shaft direction and the circumferential direction in opposing relation to said first and second stator teeth, said stator iron core being defined by punched iron plates formed by a punching mold while controlling to selectively push out and withdraw movable punches included within said punching mold and disposed to be able to be pushed out and withdrawn in each of said salient poles by a punch controller, said punched iron plates being laminated successively so that the tips of said salient poles constitute tooth tops or tooth bottoms of said first stator teeth at a predetermined period for each punching of said iron plates in order to form said first stator teeth in the inner peripheral surface of said salient poles in the shaft direction.

3. A combined linear-rotary stepping motor according to claim 1, wherein said stator iron core comprises 2 km salient poles disposed inward at an equal pitch angle, said 2 km salient poles including salient poles having said first stator teeth formed in the shaft direction and salient poles having said second stator teeth formed in the circumferential direction, both of said salient poles being disposed alternately when m is the number of phases of each linear-rotary motor and k is an integer equal to or larger than 1, and said mover iron cores include Zr mover teeth formed in the circumferential direction, and further comprising a permanent magnet held between said stator iron cores or between said mover iron cores and magnetized in the shaft direction, the number of the mover teeth Zr in the circumferential direction of the mover satisfying $$Zr=k(mb+a)$$

where b is an integer equal to or larger than 1, a is an odd number satisfying $1 \leq a < 2m$ when m is an even number and is an integer satisfying $1 \leq a < m$ or $m < a < 2m$ when m is an odd number.

4. A combined linear-rotary stepping motor according to claim 2, wherein said stator iron core comprises $2(m+n)$ salient poles disposed inward and including m sets of said salient poles each set having two adjacent salient poles having first stator teeth formed in the shaft direction and n sets of said salient poles each set having two adjacent salient poles having second stator teeth formed in the circumferential direction when m is the number of phases of a linear motor portion and n is the number of phases of a rotary motor portion.

5. A combined linear-rotary stepping motor comprising a stator including a stator iron core having a plurality of salient poles of two kinds disposed radially inward, said two kinds being alternately arranged in a circumferential direction, said salient poles of one kind having a plurality of first stator teeth formed in an inner peripheral surface thereof in the shaft direction, said salient poles of the other kind having a plurality of second stator teeth formed in an inner peripheral surface thereof in the circumferential direction and a mover including a plurality of mover iron cores supported within said stator movably in the shaft direction and rotatably in the rotation direction by means of a shaft and disposed in the shaft direction, said mover iron cores including two kinds of first and second mover iron cores, said first mover iron cores including a plurality of first mover teeth formed in an outer peripheral surface thereof at an equal pitch in the shaft direction in opposing reaction to said first stator teeth, said second mover iron cores including a plurality of second mover teeth formed in an outer peripheral surface thereof at an equal pitch in the circumferential direction in opposing relation to said second stator teeth, said stator iron core including first stator teeth defined in the shaft direction with a tooth pitch of $cmt_0$ by cm kinds of stator iron plates which are successively and repeatedly laminated so as to constitute said stator iron core and having tips of salient poles formed into different shapes with respect to a plane coordinate axis when the number of phases of a linear motor portion is m, k sets of salient poles each set constituted by cm salient poles having said first stator teeth shifted with respect to said first stator teeth of a certain salient pole by $(d/2m)cmt_0$ in the movement direction of said mover in ckm stator salient poles having said first stator teeth formed, where $c=1$ when m is an odd number, $c=2$ when m is an even number, $t_0$ is a thickness of said iron plate, k is an integer equal to or larger than 1, and d is $(cm-1)$ different integers satisfying $1 \leq d \leq 2m-1$.

6. A combined linear-rotary stepping motor comprising a stator including a stator iron core having a plurality of salient poles of two kinds disposed radially inward, said two kinds being alternately arranged in a circumferential direction, said salient salient poles of one kind having a plurality of first stator teeth formed in an inner peripheral surface thereof in the shaft direction, said salient poles of the other kind having a plurality of second stator teeth formed in an inner peripheral surface thereof in the circumferential direction and a mover including a plurality of mover iron cores supported within said stator movably in the shaft direction and rotatably in the rotation direction by means of a shaft and disposed in the shaft direction, said mover iron cores including two kinds of first and second mover iron cores, said first mover iron cores including a plurality of first mover teeth formed in an outer peripheral surface thereof at an equal pitch in the shaft direction in opposing relation to said first stator teeth, said second mover iron cores including a plurality of second mover teeth formed in an outer peripheral surface thereof at an equal pitch in the circumferential direction in opposing relation to said second stator teeth, said stator iron core being defined by laminated stator iron plates including said salient poles constituting tooth tops of said first stator teeth and said salient poles constituting tooth bottoms of said teeth, both of said salient poles being disposed in a predetermined relation, while successive ones of said stator iron plates being rotationally displaced from one another by a predetermined angle determined by the number of phases, the number of salient poles and the predetermined relation so that said first stator teeth are formed in the inner peripheral surface of said salient pole in the shaft direction, tooth tops and tooth bottoms of said second stator teeth being defined by successively laminated stator iron plates which are rotationally displaced from one another by said predetermined angle.

7. A combined linear-rotary stepping motor comprising a stator including a stator iron core having a plurality of salient poles of two kinds disposed radially inward, said two kinds being alternately arranged in a circumferential direction, said salient poles of one kind having a plurality of first stator teeth formed in an inner peripheral surface thereof in the shaft direction, said salient poles of the other kind having a plurality of second stator teeth formed in an inner peripheral surface thereof in the circumferential direction and a mover including a plurality of mover iron cores supported within said stator movably in the shaft direction and rotatably in the rotation direction by means of a shaft and disposed in the shaft direction, said mover iron cores including two kinds of first and second mover iron cores, said first mover iron cores including a plurality of first mover teeth formed in an outer peripheral surface thereof at an equal pitch in the shaft direction in opposing relation to said first stator teeth, said second mover iron cores including a plurality of second mover teeth formed in an outer peripheral surface thereof at an equal pitch in the circumferential direction in opposing relation to said second stator teeth, said stator iron core being defined by punched iron plates formed by a punching mold while controlling to selectively push out and withdraw movable punches included within said punching mold and disposed to be able to be pushed out and withdrawn in each of said salient poles by a punch controller so that the tips of said salient poles constitute tooth tops or tooth bottoms of said first stator teeth at a predetermined period for each punching of said iron plates, said punched iron plates being laminated successively in order to form said first stator teeth in the inner peripheral surface of said salient poles in the shaft direction.

8. A combined linear-rotary stepping motor according to claim 5, wherein said stator iron cores comprise 2 km salient poles disposed inward at an equal pitch angle, said 2 km salient poles including said salient poles having said first stator teeth formed in the shaft direction and said salient poles having said second stator teeth formed in the circumferential direction, both of said salient poles being disposed alternately when m is the number of phases of each linear-rotary motor and k is an integer equal to or larger than 1, said first mover iron core having a plurality of first mover teeth formed in the shaft direction at a tooth pitch corresponding to a tooth pitch of said first stator teeth, said second mover iron core having Zr second mover teeth formed in the circumferential direction, and further comprising a permanent magnet held between a pair of said first and second mover iron cores and magnetized in the shaft direction, the same number of said first mover iron cores and said second mover iron cores being magnetized to N and S poles by said permanent magnet, the number of said second mover teeth Zr satisfying $$Zr = k(mb+a)$$

where b is an integer equal to or larger than 1, a is an odd number satisfying $1 \leq a < 2m$ when m is an even number and is an integer satisfying $1 \leq a < m$ or $m < a < 2m$ when m is an odd number.

9. A combined linear-rotary stepping motor according to claim 5, wherein said mover comprises two pairs of mover cores disposed symmetrically in said shaft, said pair of mover cores including one first mover core for a linear motor and one second mover core for a rotary motor, both of which are formed integrally, and a permanent magnet held between said pair of mover cores and magnetized in the shaft direction.

10. A combined linear-rotary stepping motor according to claim 5, wherein said mover comprises, for a linear motor, two first mover iron cores and a permanent magnet held between said first mover iron cores and magnetized in the shaft direction and comprises, for a rotary motor, two second mover iron cores and a permanent magnet held between said second mover iron cores and magnetized in the shaft direction, all of which are disposed in the shaft.

11. A combined linear-rotary stepping motor according to claim 5 wherein said stator iron core comprises 2(m+n) salient poles disposed inward and including m pairs of salient poles each pair having two adjacent salient poles having first stator teeth formed in the shaft direction and n pairs of salient poles each pair having two adjacent salient poles having second stator teeth formed in the circumferential direction when m is the number of phases of a linear motor portion and n is the number of phases of a rotary motor portion.

* * * * *